United States Patent
Mladenik et al.

(10) Patent No.: US 7,352,550 B2
(45) Date of Patent: Apr. 1, 2008

(54) METHOD OF DETECTING RUN-DRY CONDITIONS IN FUEL SYSTEMS

(75) Inventors: John E. Mladenik, Escondido, CA (US); David L. Evans, Escondido, CA (US); Jose M. Barba, San Diego, CA (US); Daniel E. Fish, San Diego, CA (US); Gerald Bench, Spring Lake, NJ (US); Andrew Wagner, San Diego, CA (US)

(73) Assignee: TDG Aerospace, Inc., Escondido, CA (US)

( * ) Notice: Subject to any disclaimer, the term of this patent is extended or adjusted under 35 U.S.C. 154(b) by 440 days.

(21) Appl. No.: 11/049,278

(22) Filed: Feb. 1, 2005

(65) Prior Publication Data

US 2005/0195545 A1 Sep. 8, 2005

Related U.S. Application Data

(63) Continuation-in-part of application No. 10/866,236, filed on Jun. 12, 2004, now Pat. No. 7,254,004.

(60) Provisional application No. 60/547,099, filed on Feb. 23, 2004, provisional application No. 60/478,599, filed on Jun. 13, 2003.

(51) Int. Cl.
  *H02H 7/00* (2006.01)
(52) U.S. Cl. .......................... 361/87; 361/62
(58) Field of Classification Search .................. 361/62, 361/87
  See application file for complete search history.

(56) References Cited

U.S. PATENT DOCUMENTS

| | | | |
|---|---|---|---|
| 5,839,092 A | 11/1998 | Erger et al. | 361/42 |
| 6,583,975 B2 | 6/2003 | Bax | |
| 6,614,631 B1 * | 9/2003 | Drake | 361/23 |
| 6,618,229 B2 | 9/2003 | Bax | |
| 6,788,505 B2 | 9/2004 | Bax | |
| 2003/0030954 A1 | 2/2003 | Bax et al. | |
| 2005/0018369 A1 | 1/2005 | Bax et al. | |
| 2005/0146818 A1 | 7/2005 | Bax | |

* cited by examiner

*Primary Examiner*—Stephen W. Jackson
(74) *Attorney, Agent, or Firm*—Stephen C. Beuerle; Procopio Cory Hargreaves & Savitch LLP

(57) ABSTRACT

Systems, methods, and apparatus for fault detection and interruption in power lines are provided. Circuitry is implemented via software and hardware that is configured to sense an operational aspect of a power line, such as current levels in a three-phase power line, and apply signal processing to the sensed operational aspect to detect faults including different types of faults such as transient and steady state faults and can also be configured to identify the type of fault. Information on the fault and the identification of the type of fault can be displayed, stored, or some other output operation can be implemented. Circuitry can be implemented to provide digital signal processing and analog signal processing to, for example, independently and in parallel (e.g., redundant operation) detect faults and respond to faults as they occur (i.e., in real time).

19 Claims, 33 Drawing Sheets

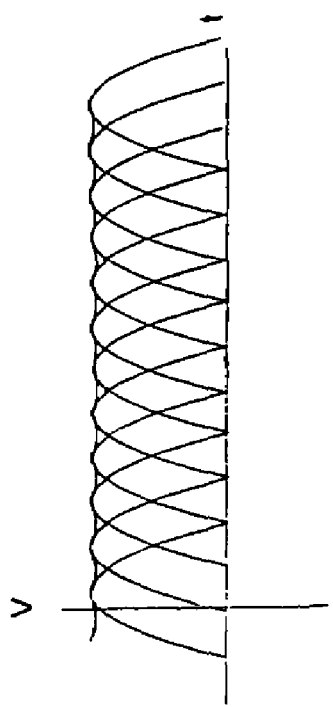
Fig. 7
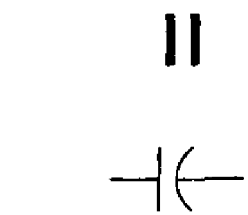
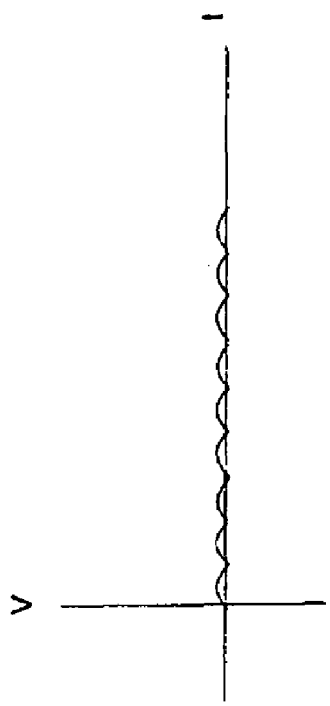
Fig. 8

3x3 Fault Characterization Array
n = negative integral x10 > positive integral
p = positive integral x10 > negative integral

| | Time 1 | Time 2 | Time 3 |
|---|---|---|---|
| Phase A | n | n | n |
| Phase B | - | - | - |
| Phase C | - | - | - |

| | Time 1 | Time 2 | Time 3 |
|---|---|---|---|
| Phase A | - | n | n |
| Phase B | - | p | - |
| Phase C | n | - | - |

| | Time 1 | Time 2 | Time 3 |
|---|---|---|---|
| Phase A | - | - | n |
| Phase B | - | n | n |
| Phase C | - | - | p |

| | Time 1 | Time 2 | Time 3 |
|---|---|---|---|
| Phase A | p | - | p |
| Phase B | - | p | p |
| Phase C | n | n | n |

| | Time 1 | Time 2 | Time 3 |
|---|---|---|---|
| Phase A | p | p | p |
| Phase B | - | - | - |
| Phase C | - | - | - |

| | Time 1 | Time 2 | Time 3 |
|---|---|---|---|
| Phase A | p | p | p |
| Phase B | p | - | - |
| Phase C | - | - | - |

| | Time 1 | Time 2 | Time 3 |
|---|---|---|---|
| Phase A | p | p | p |
| Phase B | - | - | - |
| Phase C | p | - | p |

| | Time 1 | Time 2 | Time 3 |
|---|---|---|---|
| Phase A | - | - | - |
| Phase B | p | p | p |
| Phase C | p | p | p |

| Problem | Fault | LED A | LED B | LED C |
|---|---|---|---|---|
| open | Open circuit (phase A) | blinking | off | off |
| open | Open circuit (phase A) | blinking | off | off |
| open | Open circuit (phase B) | off | blinking | off |
| open | Open circuit (phase C) | off | off | blinking |
| short | Line-to-Ground fault (phase A) | on | off | off |
| short | Line-to-Line fault (A-to-B) | on | on | off |
| short | Line-to-Line fault (A-to-C) | on | off | on |
| short | Line-to-Line fault (B-to-C) | off | on | on |

Fig. 29

METHOD OF DETECTING RUN-DRY CONDITIONS IN FUEL SYSTEMS

CROSS-REFERENCE TO RELATED PATENT APPLICATIONS

This application is a Continuation In Part of, and claims the benefit of priority to U.S. Utility patent application Ser. No. 10/866,236, filed Jun. 12, 2004 now U.S. Pat. No. 7,254,004, and which claims the benefit of priority to U.S. Provisional Patent Application No. 60/478,599, filed Jun. 13, 2003, U.S. Provisional Patent Application No. 60/547,099, filed Feb. 23, 2004, which are hereby incorporated by reference herein in their entirety.

FIELD OF THE INVENTION

The present invention relates to systems and methods for power signal interrupters and more particularly to interrupting or halting the supply of electrical power based on power signal fault conditions.

BACKGROUND OF THE INVENTION

Certain electrical systems suffer from wear and other types of physical deterioration through use or age. In aircrafts, for example, vibration, moisture, temperature extremes, and improper maintenance may contribute to failure of components in electrical systems, including wiring failures. Loose connections, broken, frayed, and/or exposed wires, may cause arcing which may be the source of electrical ignition in aircraft wiring. Circuit breakers have historically been used to protect the wiring because it was recognized that electrical arcing in and around fuel pumps, boost pump motors and fuel quality indicators are dangerous.

Additional faults may occur as a result of carbon tracking or tracing, which can deteriorate wire insulation, so as to expose the conductors and result in intermittent short circuits between individual wires or to the air frame. Short circuits can cause damage to delicate avionic equipment or electrical equipment and cause system malfunctions while the aircraft is in flight.

In general, faults on power signals in power distribution systems pose a significant problem to systems or devices thereby powered. In certain systems electrical faults, such as arcing, can have catastrophic results. For instance, arcing from the electrical circuitry of an airline fuel pump may cause a fuel tank explosion leading to the loss of the aircraft. Similarly, arcing between wires proximate to the cockpit can cause sufficient cockpit smoke to also lead to an airliner crash. In less critical applications, such as commercial and industrial environments, electrical faults lead to significant damage, requiring inconvenient and often costly repairs.

Traditional solutions for electrical faults use circuit breakers, which can only detect ground faults and operate to shut down the electrical circuit after arcing has been occurring for some time. This protection circuitry is based upon current transformers and is large and bulky.

The problems with current fault detection systems are enhanced when dealing with electrical systems which are critical to the proper operation of the aircraft, and particularly when associated with aircraft fuel systems. For instance, in some circumstances fuel with an aircraft fuel tank will be depleted, or the craft may bank thereby displacing or "sloshing" the fuel within a tank, resulting in a temporary cessation of fuel being pumped. In circumstances where the fuel system includes a primer pump, the dry-running of the fuel can create a very dangerous condition, and may cause serious damage to the aircraft. Unfortunately, the current method of detecting and preventing a "run-dry" condition of the fuel primer pump involves a user detecting a decrease in fuel pressure, and a manual turning-off of the fuel pump. This approach is at best slow, and at worst, ineffective, at preventing hazardous "run-dry" condition.

It would be beneficial to provide an interrupter device that functions to detect potentially hazardous faults in power lines prior to the fault being passed downstream by "instantaneously" removing the power from a device when such faults are detected.

SUMMARY OF THE INVENTION

In accordance with the principles of the present invention, apparatus and methods provide for detecting faults or a condition of interest on a power line and generating a response to the detected fault or condition, such as to interrupt the signal flow on the power line. Such techniques may for example be used to implement a fault interrupter that can interrupt the signal on a power line by detecting one or more of different types of faults. Such a fault interrupter may sometimes be referred to as a universal fault interrupter. Such circuitry or methods can be configured to, for example, protect an electrical system and components therein by continuously detecting and preventing various faults. In the context, for example, of power lines, the types of faults include line-to-line, ground, open, imbalance, out-of-range, and arc faults. Fault interrupt circuitry can be configured for example to prevent faults by immediately shutting down the circuit as soon as the fault is detected. When a fault is sensed, circuitry configured to operate to automatically can generate a response such as to switch a power control relay or the like to the open position to instantly remove power. Such operation prevents the fault from occurring at a downstream device, thus substantially reducing or eliminating the chance of producing a fire and/or preventing possibly serious damage to an aircraft or some other type of device.

When a fault occurs that has no current escaping to ground, the current may be escaping to another line or the impedance of the load may change dramatically resulting in an over-heated condition in the wiring. The circuitry of the present invention can detect such a condition and can act in response, such as, to open a relay or the like to redirect power. Transformers and intelligent logic circuitry may for example be used to enable the circuitry to detect and isolate power when these types of faults occur. In another aspect, the circuitry can be configured to report the type of fault detected. In a further aspect, circuitry can be custom programmed to operate with varying loads and different fault detection scenarios. The circuit may allow the recording and later retrieval of power signal data and fault history. If desired, the circuit can also be configured to act as a digital oscilloscope and monitor the current and voltage in real time and send the information through the data port. Software running on a data retrieval terminal computer could display the data in real time to act as a real time oscilloscope.

Such systems and methods may have applications in a wide range of electrical systems. One application may be in the field of aircrafts in which there are significant safety concerns. For example, a fault in an aircraft can result in a fire or explosion such as when an arc occurs as a result of fault in the vicinity of the aircraft fuel pump or boost pump motors or in the vicinity of systems of other devices where an arc could cause significant damage while in flight.

In an aircraft, for example, the circuitry of the present invention can protect systems both while an airplane is in the air and when it is on the ground. More specifically in the aviation field, such fault interrupter circuitry may advantageously assist aircraft manufacturers and airlines in complying with Federal Aviation Administration requirements such as SFAR 88, which requires the use of safety systems that do not impact the fuel system of the aircraft. The invention also provides a cost-effective, universal solution to the problem of line-to-line, ground, open, imbalance, out-of-range, and arc faults. As mentioned above, the systems and methods illustratively described herein also have applications in areas other than aviation, such as in other transportation areas, including in sea faring vessels, trains, and road vehicles, and such as in buildings, power generation and distribution structures and networks, robotic equipment, and in electric and electronic devices, including appliances and computers.

Another system of the present invention includes the instantaneous detection of a "run-dry" fault condition of a fuel pump, the evaluation of that condition, and the turning-off of the fuel pump to eliminate the fault condition within a matter of milliseconds. This is accomplished through the real-time monitoring of the current passing through the three phase (3Φ) windings of the fuel pump. When an abrupt decrease in phase currents is detected across all three phases, the fuel pump is in a "run-dry" condition. If this condition continues, a fault condition is considered to be occurring, and the fuel pump may be turned off within a matter of milliseconds from the detection of the "run-dry" condition.

BRIEF DESCRIPTION OF THE DRAWINGS

Other aspects and advantages of the present invention will become clear from reading the following detailed description of the invention, given by way of example and with reference to the appended drawings, in which:

FIG. 7 is a signal diagram of a summing signal of three phases of a power line after signal processing in accordance with one embodiment of the present;

FIG. 8 is a signal diagram of a filtered output of the signal of FIG. 8 in accordance with one embodiment of the present invention;

FIG. 29 shows spreadsheets of illustrative arrays and fault characterizations in accordance with one embodiment of the present invention.

Like reference numbers in the various drawings indicate like components.

DETAILED DESCRIPTION OF THE PREFERRED EMBODIMENTS

Figure 1:
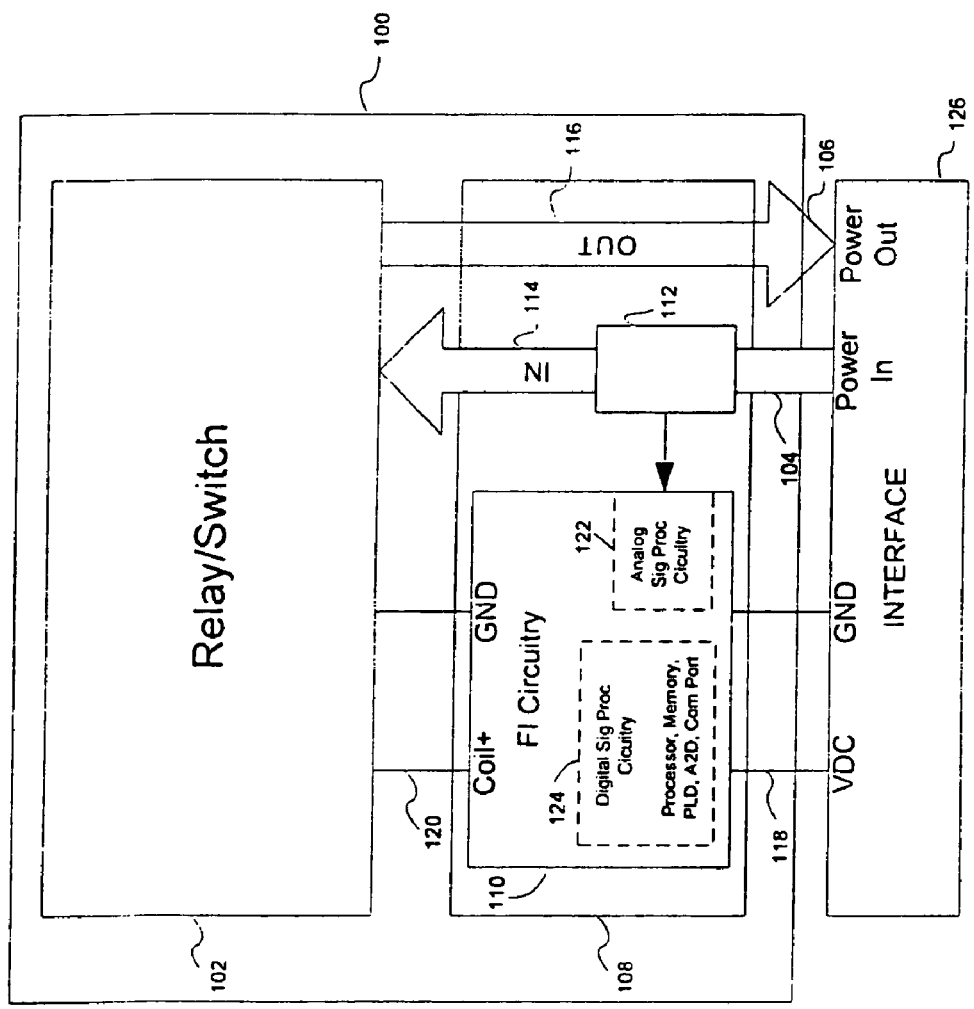
FIG. 1 is functional block diagram of a fault protection apparatus in accordance with one embodiment of the present invention.

FIG. 1 is a functional block diagram of an illustrative power fault protection apparatus 100 for interrupting the supply of power in response to a power signal fault condition in accordance to a preferred embodiment of the present invention. Apparatus 100 includes relay or switch 102 (hereinafter, relay 102) to connect electrical signals on power-in conductors 104 to power-out conductors 106. Relay 102 can include relay or switch circuitry that can be actuated to controllably pass power signals through relay 102. Relay or switch circuitry of relay 102 should have sufficient capabilities to handle the intended power load. Such circuitry can include relays (e.g., relays used in aerospace electrical systems to channel power to subsystems such as boost pumps), contactors, or other types of switching circuitry such as semiconductor switching circuitry (e.g., solid state switches). Such circuitry can also include additional circuitry such as a coil or transformer for actuating a relay or switch or other related circuitry. Apparatus 100 of FIG. 1 also includes fault interrupt circuitry 108. Fault interrupt circuitry 108 and relay 102 are shown as two separate devices, but may in some circumstances be desirably arranged as a single device or as three or more devices.

Fault interrupt circuitry 108 of the preferred embodiment includes fault interrupt circuit 110, sensor circuitry 112, and other circuitry such as power-in conductors 114 and power-out conductors 116. Fault interrupt circuitry 108 is supplied with power using power supply conductor 118, which, for example, is used to apply a direct current ("DC") voltage to fault interrupt circuitry 108 (e.g., to supply power to fault interrupt circuit 110). If desired, other types of power (e.g., from other sources of power) can be supplied on power supply conductor 118 (e.g., AC power). However, the supply of other types of power such as alternating current ("AC") power can add to the internal circuitry of fault interrupt circuitry 108 because of the potential need for additional converter circuitry, which may not be needed when using DC power. Fault interrupt circuitry 108 of FIG. 1 includes output conductor 120 to supply an activation signal and/or a power signal (e.g., to supply DC power) to relay 102 to open or close the power distribution channel(s), which is under the control of relay 102. If desired, relay 102 can be supplied with power through a route or from a power source that that does not require the signal to pass through fault interrupt circuitry 108. Ground connections can be included for providing a ground connection for fault interrupt circuitry 108 and relay 102.

The number of separate conductors and the type of conductors used for power-in conductors 114 and power-out conductors 116 can depend, for example, on the physical dimension of the fault interrupt circuitry 108, the type or the wattage of the power signal or signals that are to be carried by power-in and power-out conductors 114 and 116. For convenience, plural tense is primarily used herein for power-in and power-out conductors 114 and 116. If desired, power-in and power-out conductors 114 and 116 can be external to fault interrupt circuitry 108 or can be configured to include portions that are internal and other portions that are external to fault interrupt circuitry 108 (e.g., power-in conductors 114 may be internal, while power-out conductors 116 may be external). Fault interrupt circuitry 108 can include sensor circuitry 112 that is arranged in a physical relationship to power-in conductors 114 to sense signal characteristics of the power signal(s) carried by power-in conductors 114.

Sensor circuitry 112 can be of the type that can generate outputs that are reflective of or proportional to electrical activity on power-in conductors 114 based on electromagnetic radiation emanating from those conductors. As such, sensor circuitry 112 is non-intrusive and will not alter the electrical characteristics of electrical signals that are in power-in conductors 114. If desired, other types of sensor circuitry can also be used to replace the "non-intrusive" type mentioned above, or in combination with the "non-intrusive" type. Sensor circuitry 112 can be configured to have output signals that are generated based on operational aspects of the power line such as voltage or current levels, variations in levels, cycles, phase, other signal characteristics, combinations thereof.

Output signals from sensor circuitry 112 are preferably supplied to fault interrupt circuit 110 for signal processing and analysis. Fault interrupt circuit 110 include analog signal processing circuitry 122 (e.g., hardware based fault detection) and digital signal processing circuitry 124 (e.g., software based fault detection). Analog signal processing circuitry 122 can, for example, include gain circuits, filters, comparators, etc. Analog signal processing circuitry 122 can be arranged to receive output signals (e.g., analog signals) from sensor circuitry 112 or signals that are based on output signals from sensor circuitry 112. Digital signal processing circuitry 124, analog signal processing circuitry 122, a combination thereof, or related circuitry in fault interrupt circuitry 108 can be configured (e.g., by arranging circuitry, by programming circuitry, by establishing a physical relationship between components, etc.) to perform one or output operations when an operational aspect(s) sensed by sensors 112 shows the existence of one or more characteristics that are indicative of a particular condition of interest such as a fault. The condition of interest may be a single type of fault or may be a plurality of different types of faults (e.g., a ground, a line to line, an open, an arc fault, etc). As part of this process, the circuitry can be configured to perform signal processing to produce one or more output signals that are reflective of whether the signal(s) sensed by sensor circuitry 112 show one or more characteristics that are indicative of a particular condition of interest such as a fault (e.g., a ground fault, a line to line fault, an open fault, an arc fault, etc). The particular condition of interest can include a condition that has just occurred in response to which analog signal processing circuitry 122, digital signal processing circuitry 124, or a combination thereof may act "instantaneously" to aid in switching relay 102 to block power signals from continuing through power-out conductors 116. Thus, the output operation can include generating a signaling output that signals to a recipient device information indicating that the power line is to be disconnected from a load. Other output operations can include storing information in a database regarding the conditions detected, displaying information, activating an indicator (e.g., by generating a signaling signal to light LEDs), or other operations.

In some embodiments, the output operation may involve generating a signal to accomplish an operation in an external device. In other embodiments, a signal can be generated as part of an internally implemented output operation. If desired, digital circuit components can be implemented as part of analog signal processing circuitry 122 and analog circuit components can be implemented as part of digital signal processing circuitry 124. For the most part, the functionality of digital signal processing circuitry 124 is directed towards digital signal processing and the functionality of analog signal processing circuitry is directed towards analog signal processing. Hardware, software, or both can be implemented to configure digital signal processing circuitry 124 and analog signal processing circuitry 122.

Digital signal processing circuitry 124, for example, can include a microprocessor, memory, analog-to-digital converters, programmable logic devices, communications ports, etc. Digital signal processing circuitry 124 of FIG. 1 receives signals that are based on output signals from sensor circuitry 112, or if desired receives signals from sensor circuitry 112 depending on the arrangement. Digital signal processing circuitry 124 can be configured to include analog to digital converter circuitry to handle the conversion of analog signals to digital for use in digital signal processing circuitry 124. Digital signal processing circuitry 124 may be arranged to detect faults or conditions of interest and can be further configured to identify the type of fault that was detected (e.g., detected by analog signal processing circuitry 122, digital signal processing circuitry 124, or both) or identify information providing quality, type, or characteristic information for a detected condition of interest (e.g., a fault). Fault interrupt circuitry 108 can, for example, include circuitry for displaying information on what was detected or identified and include memory (e.g., as part of digital signal processing circuitry 124) to store information about the detection and/or identification of such detected conditions of interest. Software may reside in memory as part of digital signal processing circuitry 124 for implementing such features. If desired, a programmable logic device or other digital logic can be used to provide such features.

The components of fault interrupt circuitry 108 (e.g., digital signal processing circuitry 124 or components thereof) can, for example, be arranged together (e.g., on a single board) or arranged separately (e.g., two or more circuit boards or devices such as to arrange digital signal processing circuitry 124 on one circuit board and the other components such as analog signal processing circuitry 122 and sensor circuitry 112 on a separate board). If desired, one or more boards can be used that include a combination of digital and analog circuitry. Digital signal processing circuitry 124 preferably includes software components (e.g., machine executable code) for configuring digital signal processing circuitry 124 to support the functionality of fault interrupt circuitry 108. If desired, programmable components (e.g., programmable analog circuits) may be included as part of analog signal processing circuitry 122.

Interface 126 of the representative embodiment of FIG. 1 is the means by which fault protection apparatus 100 is connected to a power bus within a particular electrical system. Interface 126 can, for example, be a connector having sufficient pins and conductors for coupling the power bus or any other signals to fault protection apparatus 100. If desired, interface 126 can be a hardwired connection or some other form of interface to the power bus. Interface 126 can be a consideration in existing electrical systems, which use standard connectors for mating to relays or switches for the distribution of power. In such circumstances, fault interrupt circuitry 108 and housing thereof may be configured to be a plug-in device between relay 102 and interface 126. For example, the foot print of fault protection circuitry 108 can be configured to fit within the footprint of relay 102 and/or fault protection circuitry can have connections and housing that is adapted to mate with interface 126 and to mate with relay 102, wherein fault protection circuitry 108 may be conveniently plugged in between existing relays 102 and relay connectors.

Power under monitoring by the fault protection system may be from a power generator in a closed electrical system (e.g., in an airplane) or may be received from a distributed power supply system. The power supplied may be AC, DC, single phase, three phase, or other type of AC or DC power signal. The power supplied may be, for example, a 3-phase, 208VAC, 400 Hz circuit. A power line that is being monitored and checked for faults by fault interrupt circuitry 108 can be of the type that uses a single wire to deliver the intended power to a load or can be of the type that requires a plurality of wires (e.g., three wires for a three-phase power line) to collectively deliver the intended power (e.g., a balanced multi-phase AC power) to the load connected to the power line.

If desired, fault protection apparatus 100 is configured for fault protection in the distribution of power to multiple subsystems. For example, relay 102 may be configured to include multiple relays or switches (e.g., for distributing power to an entertainment system, a pump, etc.) and fault apparatus circuitry that can be configured to, for example, provide the functionality mentioned above for single or multiple incoming power lines that are to be connected to such subsystems through one or more relays 102. As such, apparatus 100 can be considered a system control unit for providing fault protection for multiple subsystems.

Figure 2:
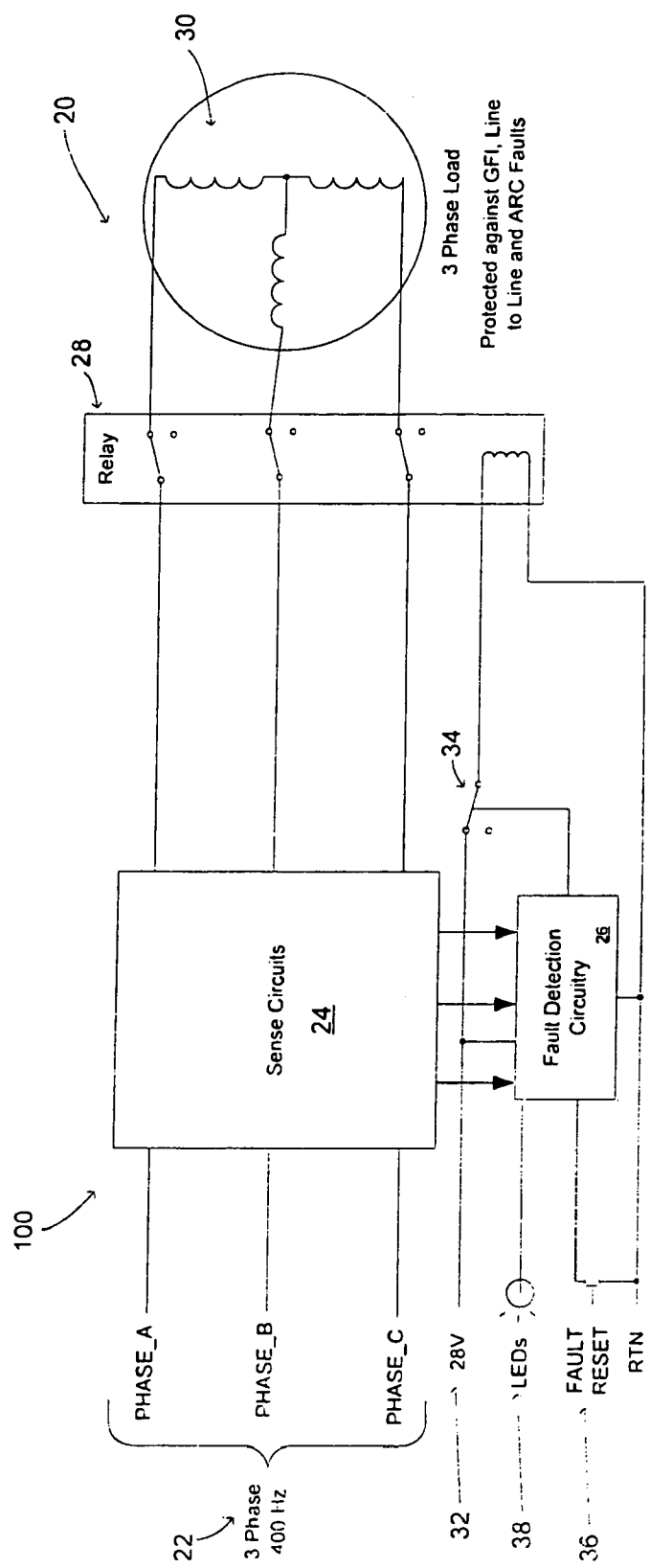
FIG. 2 is a functional block diagram of a fault protection apparatus in accordance with one embodiment of the present invention.

For convenience, the illustrative examples discussed herein are presented primarily in the context of being used for three phase power, in the context of current sensing and analysis, in the context of power connection through a relay, and in the context of application to electrical systems for airplanes. However, other such context may also be contemplated in accordance with the present invention. FIG. 2 shows an illustrative embodiment of FIG. 1 in which fault protection apparatus 100 is configured for three phase power. Fault protection apparatus 100 may be used to protect three-phase load 30 (e.g., a motor) from being damaged in the event of a fault condition such as ground, line-to-line, open, imbalance, out-of-range, and arc faults occurs. Thus, fault protection apparatus 100 can detect primary faults in AC poly phase power lines.

Referring further to fault protection apparatus 100 of FIG. 2, a three phase, 400 hertz input signal 22 is provided to sense circuitry 24, which may be one embodiment of sensor circuitry 112 of FIG. 1, to generate output signals for fault detection circuitry 26. FIG. 2 also illustrates one embodiment of fault protection circuit 108 of FIG. 1. Fault detection circuitry 26 is connected to relay 28 associated with three phase load 30. Fault protection apparatus 100 includes an input control voltage 32 of, for example, 28 Volts DC ("VDC"), which is commonly used on commercial aircrafts, but other input voltages may also be used (e.g., from about 7 VDC to about 36 VDC). A regulated power supply circuit can be included in fault protection apparatus 100 to generate a 5V output from the 28 VDC. If desired, the regulator may handle a range of voltage inputs (e.g., 6.5 Volts and 40 Volts). Input control voltage 32 can be connected to relay 28 and to fault detection circuitry 26 through switch 34, which can, for example, be a solid-state field-effect transistor (FET). Fault reset button 36 and one or more indicator lights 38 can also be connected to fault detection circuitry 26. Indicator lights 38 can be light emitting diodes (LEDs). The fault detection threshold of fault protection apparatus 100 can be programmed to be set to determine when a fault is detected. For example, programmable circuitry may be included for setting the threshold such as from about 1 to about 5 amps in 0.1 ampere (amp) increments. Other threshold arrangements can also be used. An "instantaneous"type response time should preferably be implemented which would, for example, be less than about 350 microseconds, and may if desired, be controllable by programming. Fault interrupt apparatus 100 can be configured to monitor the current in each of the three phases in combination, or if desired independently, and determine if there is a condition of interest such as a ground fault, a line-to-line fault or an arc fault present.

When a condition of interest is detected, fault protection apparatus 100 preferably operates to automatically and immediately open relay 28 to "instantly" cut off power to load 30. Fault protection apparatus 100 can be configured to maintain a fault status (e.g., remain latched) until, for example, after reset button 36 is pressed (e.g., held pressed for a predetermined period of time such as about 0.5 seconds). Fault detection circuitry 26 can, for example, include a microprocessor that, for example, is programmed (e.g., software saved in fault detection circuitry 26) to automatically reset the fault status after a predetermined time elapses, and be further configured, for example, to issue a warning if relay 28 is opened due to a repeated fault condition for a predetermined number of times within a predefined time period. Other permutations of these operating conditions can be used as well.

Figure 3A:
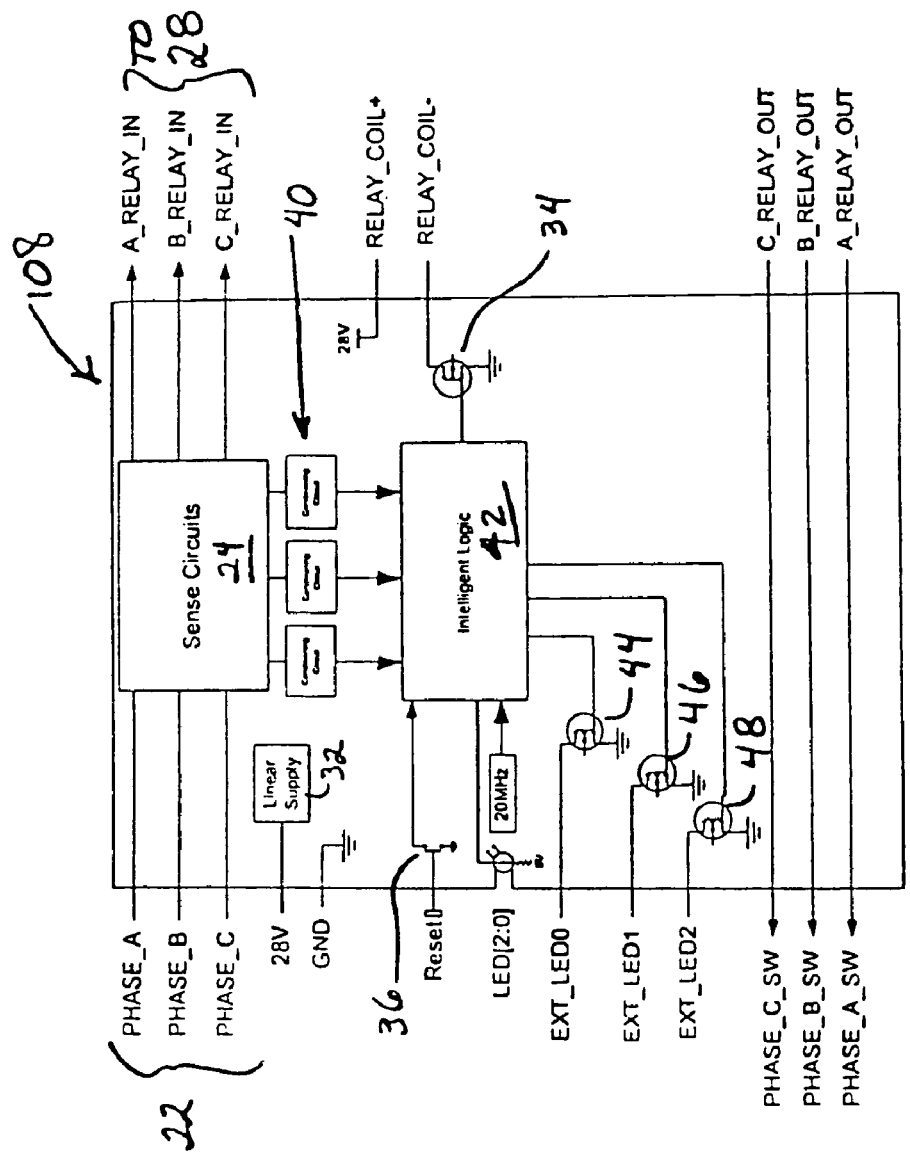
FIGS. 3A-3D are functional block diagrams of fault protection circuitry in accordance with embodiments of the present invention.
Figure 3B:
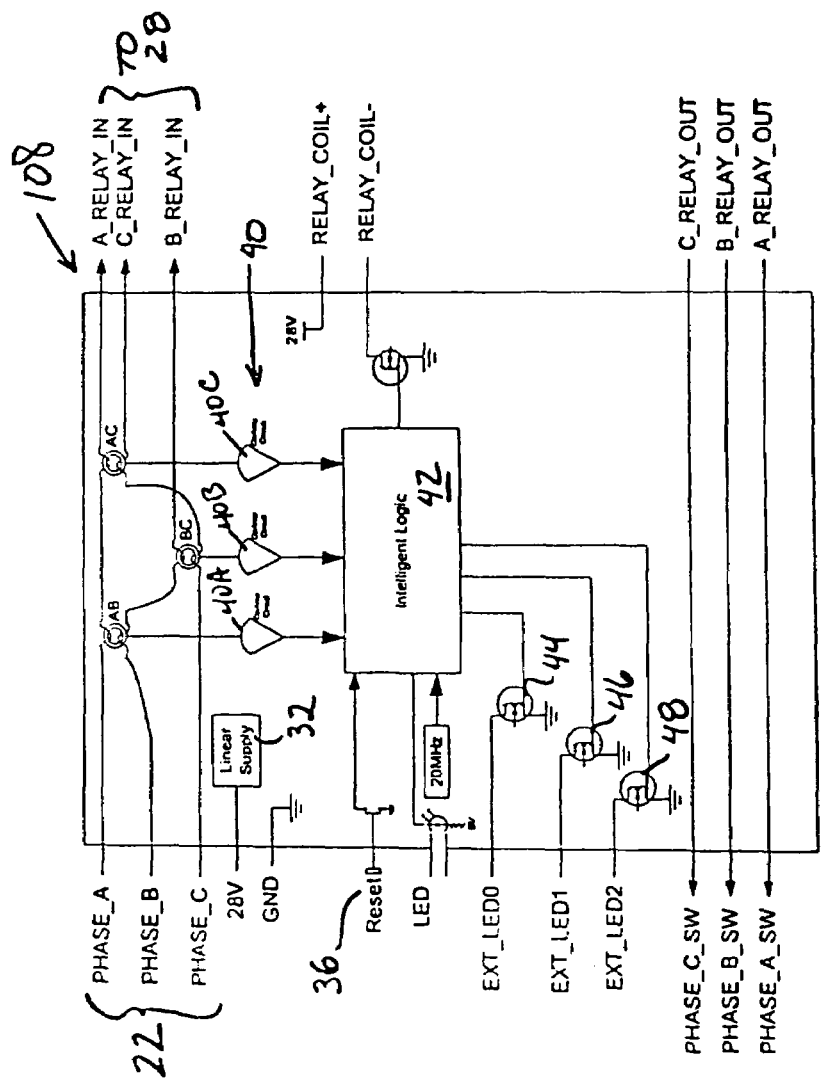

FIGS. 3A and 3B show illustrative examples of implementations of fault interrupt circuitry 108 of fault protection apparatus 100 of FIG. 2 in further detail for the example of three-phase power and 28 VDC power supply. Referring to FIG. 3A, three phase signal 22 can be provided to sensor circuits 24 and applied to relay circuit 28 (see FIG. 2). Fault protection apparatus 100 is shown to include conditioning circuits 40 and intelligent logic circuitry 42, which, for example, includes a microprocessor and a Complex Programmable Logic Device (CPLD). FET switch 34 can be utilized to remove a 28 VDC input control voltage 32 from the relay upon detection of a condition of interest by intelligent logic circuitry 42. At least one of LED indicator lights 44, 46 and 48 is illuminated when, for example, a fault is detected to provide a visual indication of the type of fault that exists. Although, if desired, another interface with the user can be provided, such as a warning signal on a multifunction display. Such visual displays can be located on the housing of fault protection apparatus 100 or alternatively or in addition to, in some other location (e.g., an airplane cockpit or other location in the aircraft).

With reference now to FIG. 3B, sensor circuitry 24 can, for example, include three current sense transformers AB, AC, and BC. The current transformers can, for example, be made of a ferrous material wrapped in wire such that their transformer characteristics fit a particular application. Use of three such current sense transformers enables fault interrupt circuitry 108 to, for example, detect ground faults, that is, any current that is sensed by the current sense transformer on a particular phase that is not returned in full on other phases may indicate that some current is being lost to, for example, the airframe ground. In one example of implementation of fault interrupt circuitry 108, the three sensors produce outputs that are representative of the AC current being monitored.

Figure 3C:
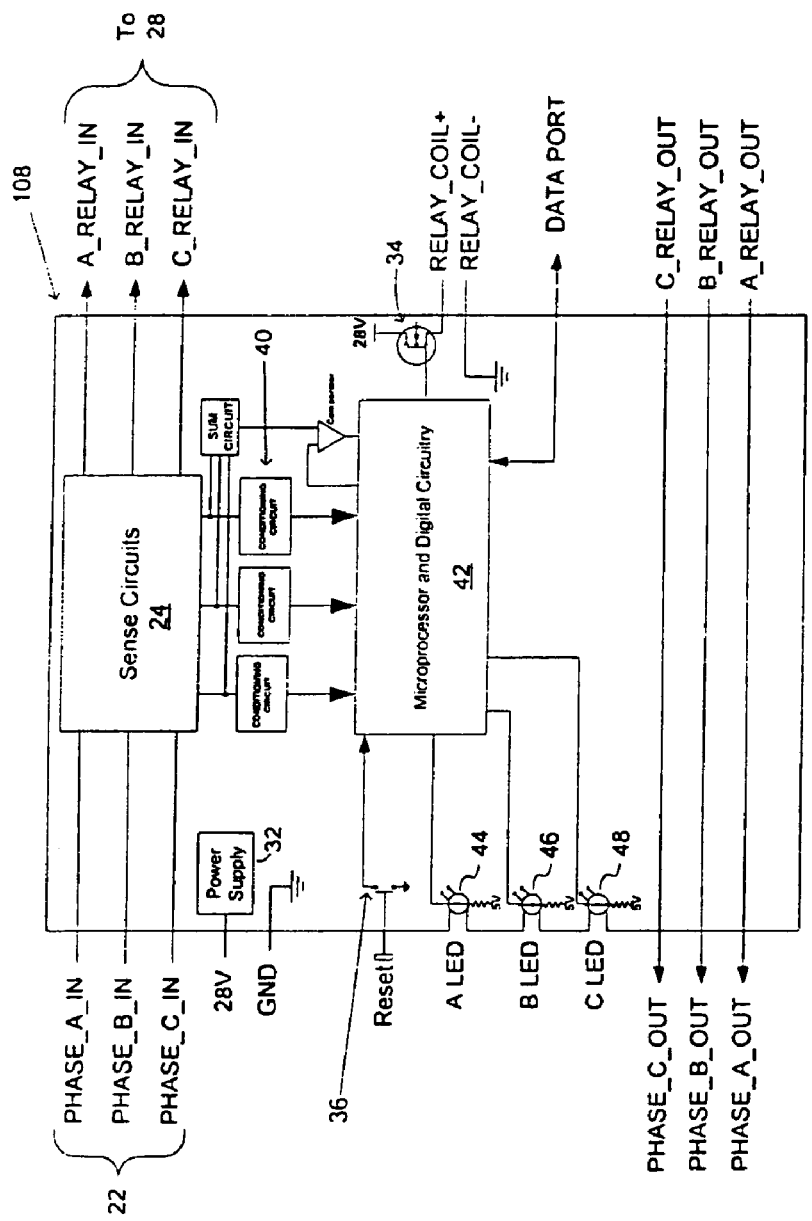
Figure 3D:
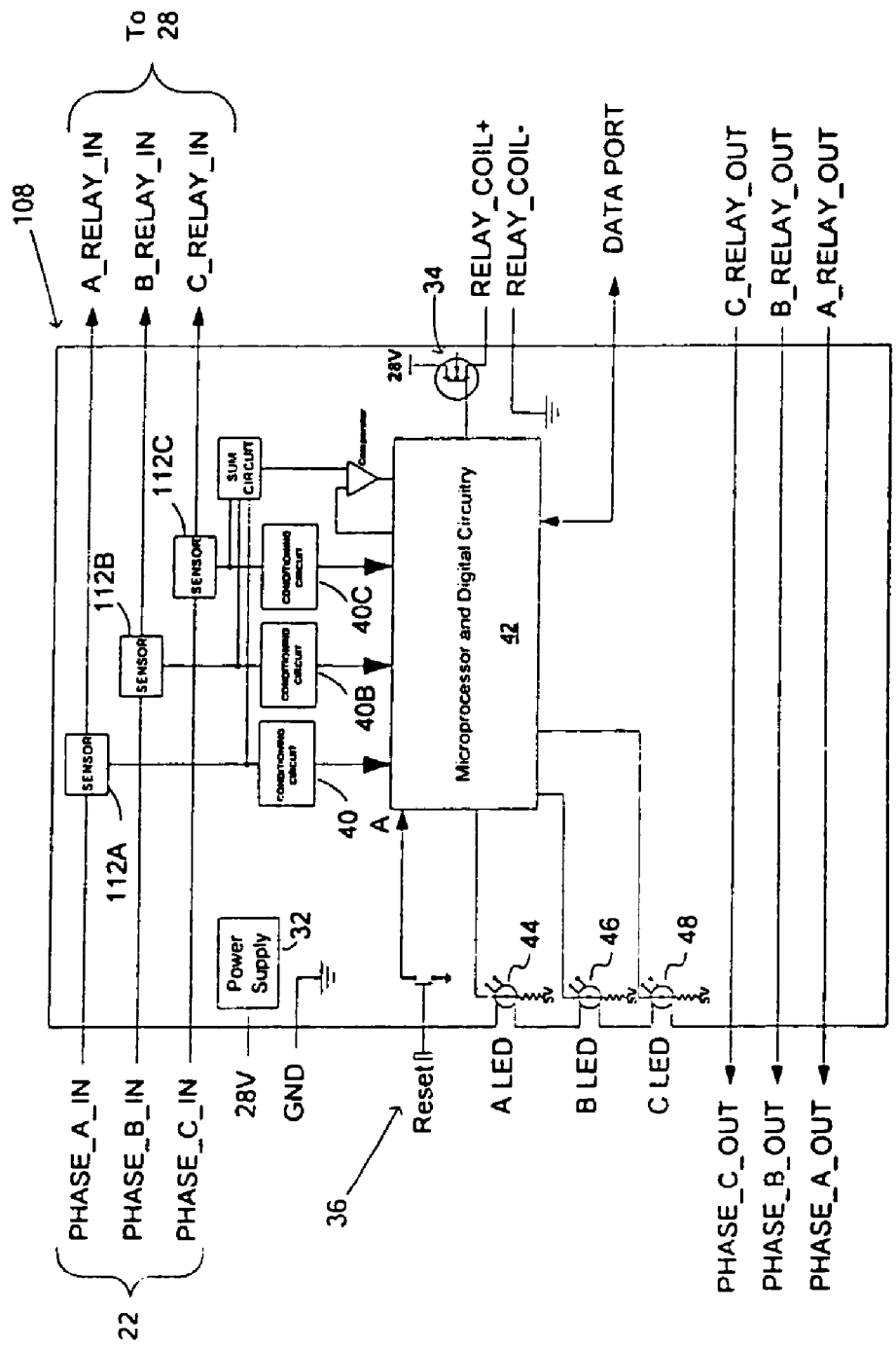

The outputs are, for example, subjected to signal processing such as to be full-wave rectified and filtered to produce a resulting output, which may be a pulsating DC voltage. The resulting outputs (e.g., voltages) can represent instantaneous phase currents and can, for example, be monitored in real time using circuitry such as a fast analog-to-digital converter. Resulting analog to digital ("ADC") converter values can be interpreted by analog or digital circuitry of intelligent logic circuitry 42 (e.g., using a microprocessor with software programming and a CPLD). For example and not as a limitation, such interpreted signals can be used to determine if all three sensor outputs are within a predetermined window of values that represent, for example, normal or balanced load operation of a power line(s) being monitored, such as, a power line to a pump motor. If one or more phases are detected to have a fault condition, the condition can be recognized by, for example, the software, and the microprocessor signals can be transmitted to open the relay, to illuminate one or more LEDs, and to store operating parameters in non-volatile memory. Each of the current sense transformers can be connected to an operational amplifier gain circuitry 40A, 40B, 40C which can have outputs connected to intelligent logic circuitry 42. The fault interrupt circuitry 108 can operate to detect faults such as from each phase to ground and from phase to phase, to protect a device to which power is being supplied from being damaged in the event of a fault. FIGS. 3C and 3D show variations of FIGS. 3A and 3B that include summing circuitry and a comparator to illustrate one specific technique of analog signal processing involving the use of phase differentials to detect faults.

Figure 4A:
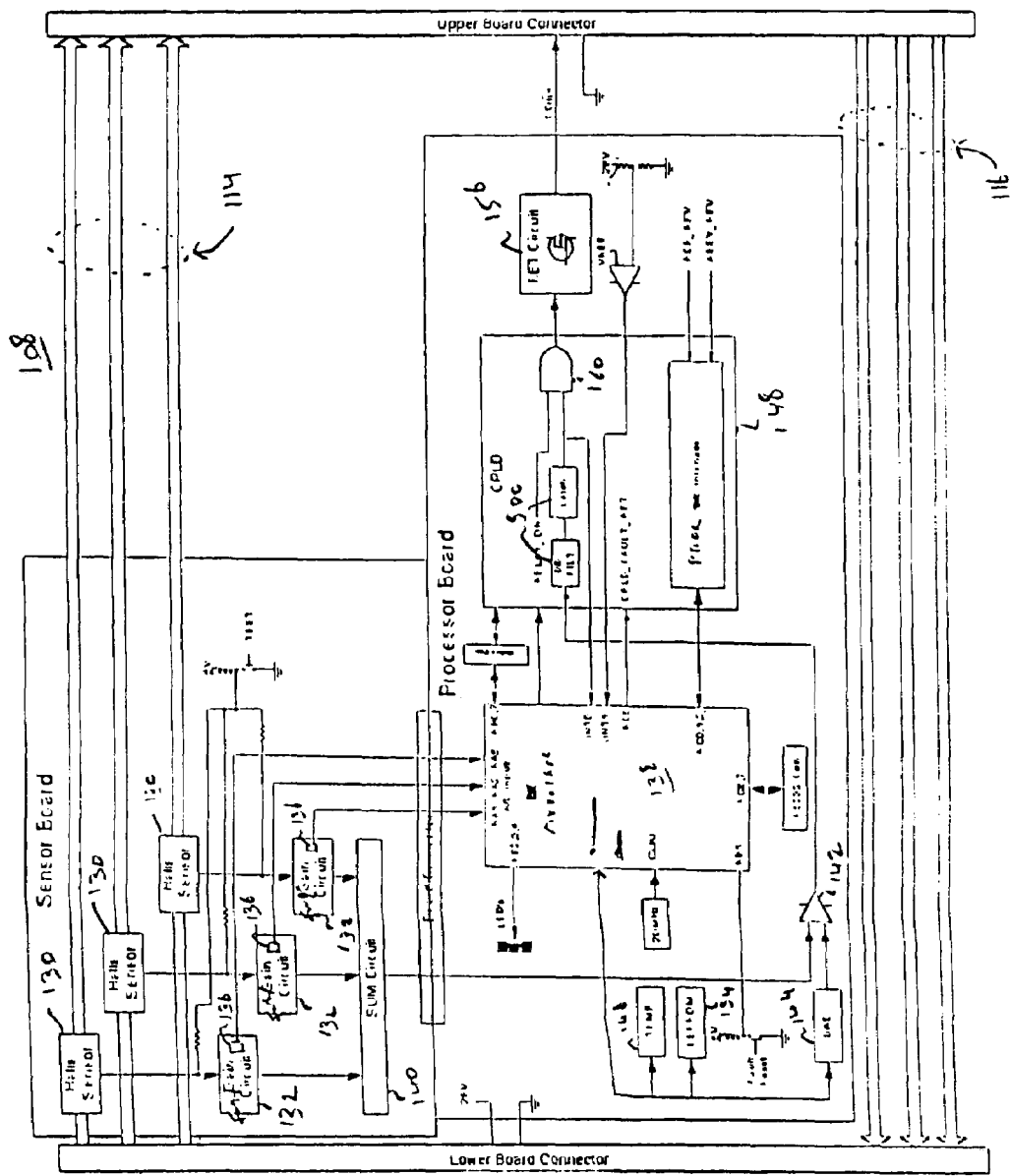
FIGS. 4A and 4B are functional block diagrams of fault protection circuitry in accordance with embodiments of the present invention.

FIG. 4 shows a functional block diagram of another exemplary embodiment of fault interrupt circuitry 108 of the present invention for use in the illustrative application of three phase power and 28 VDC power for actuating a relay or switch. With reference now to FIG. 4, fault interrupt circuitry 108 can include three Hall Effect sensors 130, which may include related circuitry, which are arranged to sense signals and generate output signals that are proportional to the sensed signals. Hall Effect sensors 130 are devices that are known in the field of electronics. Each Hall sensor 130 is preferably arranged to sense information on power signals carried by a corresponding power-in conductor 114. Each power-in conductor 114 is preferably used to carry a single phase of a three phase power signal. As such, the outputs of Hall sensors 130 will each reflect the current condition of the phase current monitored by that corresponding Hall sensor 130 (e.g., independently monitor each phase) when power is coupled to a "down-stream" device to power that device through the distribution of the power signal through a relay or switch that is connected to fault interrupt circuit 108.

The outputs of Hall sensors 130 can be subject to analog circuitry processing. For example, each output can be routed to analog circuitry that is configured to provide a full wave rectified signal from the received output signal from the Hall sensors 130 (e.g., each Hall sensor 130). In addition, gain circuitry can be implemented to amplify the resulting full wave rectified ("FWR") signal. For example, FWR/gain circuits 132 can each be configured to receive output signals from a corresponding Hall sensor 130 and to produce a full wave rectified signal with a predetermined gain based on the output signals from Hall sensors 130. The parameters of gain circuitry in FWR/gain circuits 132 can be selected in consideration of the dynamic range of the signal being monitored. The gain should not be so high as to cause saturation or clipping of the signals at hand. If desired, gain circuitry can be configured (e.g., programmed) to be controlled to switch between two or more gain settings to improve the signal condition.

Appropriate variations in the overall circuitry can be implemented to implement gain switching to provide desired functionality. The programmable gain settings may be useful during startup. For example, when fault interrupt circuitry 108 connects power to the load, the gain can be set to a low gain value so that start-up currents can be monitored over the initial startup period (e.g., the first several hundred milliseconds) while the load reaches steady state (e.g., the pump spools up). As the motor currents drop to steady-state values, the gain can be set to a high value to observe lower current at a higher sensitivity. The ability to observe and record the motor start-up currents can be an advantageous feature. The start up data can be stored in the history log and can provide an early warning of load malfunction or potential malfunction (e.g., motor/pump wear).

Figure 5:
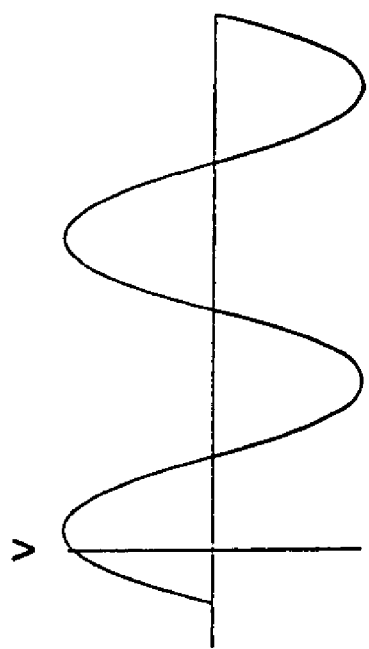
FIG. 5 is a signal diagram for an alternating voltage signal.

As mentioned, above, Hall Effect sensors 130 on each of the 3 phases of the power can be used to monitor the current levels of each phase independently. Hall Effect sensors 130 can each produce output voltages that are proportional to the magnetic field in the trace that runs directly below that sensor 130 (e.g., see FIG. 5). If desired, a Hall Effect sensor having for example a high bandwidth of about 100 Hz and a response time of about 6 µs can be used. Other suitable Hall Effect sensors may be also be used. Since the magnetic field is proportional to the current, sensor output is a measure of current that flows in the trace. By monitoring each of these phases it is possible to detect conditions of interest such as ground faults, line-to-line faults, open faults and arc faults. In the event of any of these faults, the circuit can be activated to switch the relay off and light LEDs.

A ground type fault can for example be an intermittent Ohmic connection from a phase to earth ground. A line-to-line type fault can for example be an intermittent Ohmic connection between two phases. This is one type of arc fault that can occur in wiring.

Figure 6:
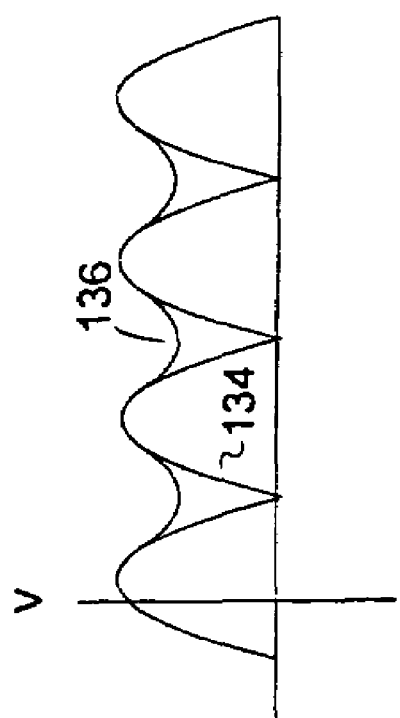
FIG. 6 is a signal diagram of a full-wave rectified signal and filtered signals of sensor circuitry in accordance with one embodiment of the present invention.

Within FWR/gain circuits 132, the output of the three current sensor's 130 can, for example, be filtered through a capacitor that removes the DC offset from those outputs, and feeds the filtered signal to the gain circuitry (e.g., operational amplifier circuitry). Operational amplifier circuitry can be used to provide gain and to AC rectify (e.g., see line 134 in FIG. 6) the signals that come from the current sensors, as also mentioned above. The gain of this circuit can, for example, be changed by changing resistor values.

FWR/gain circuits 132 of FIG. 4 include filters such as RC filters, shown adjacent to FWR/gain circuits 132, to filter the full wave rectified (and amplified) sensor outputs. The filtered version of the full wave rectified sensor outputs (e.g., see line 136 of FIG. 6) can be applied to microprocessor 138. Summing circuitry 140 also can be provided for summing the three full wave rectified (and amplified) sensor outputs without the use of RC filters (e.g. see FIG. 7). Summing circuitry 140 can be configured to include filter circuitry for filtering the summed signal to, for example, remove a DC offset from the summed signal (e.g. using a capacitor). See FIG. 8. The summed and filtered signal can be routed to analog comparator 142 that, for example, have a programmable threshold. Analog comparator 142 can be configured via digital to analog converter 144, which can be configured to receive inputs from a microprocessor to set a desired threshold for detecting faults. In such an arrangement, when a fault occurs in any of the 3 phases, the current signal from summing circuit 140 will increase above the set threshold in comparator 142 to activate the output of comparator 142. It has been found that the output of comparator 142 can indicate the existence of a condition consistent with a fault within about a half cycle and as fast as about 1 microsecond for a conventional three-phase power line.

In this example, a 28V DC voltage power supply is used that is, for example, supplied by an electrical system of an aircraft. As mentioned above, power regulator circuitry may be used to provide other applicable DC voltages for use by the circuitry.

Fault interrupt circuitry of FIG. 4 may have sufficient intelligence for making fault condition decision. For example, and not limitation, microprocessor 138 (e.g., a microchip style microprocessor) can be used to control converter 144, take temperature reading from temperature sensor 146, and perform processing to determine what type of fault has occurred. Microprocessor 138 can have a communications port (e.g., an RS232 port), for example, to provide test and debug capabilities. If desired, circuitry for providing communications compatibility to the selected type of communications port may be located outside of fault interrupt circuitry 108 and, for example, be arranged on a cable that is connected for connecting to fault interrupt circuitry 108.

A complex programmable logic device (CPLD) 148 can be configured to contain logic to make an immediate decision on whether a fault has occurred. CPLD 148 can also be configured to include digital filter and latch 500 and one or more registers for storing information such as board and assembly revision information and the enable for the RS232 transceiver. All or part of the functionality of CPLD 148 can, if desired, be implemented using other circuitry (e.g., a processor).

CPLD 148 can monitor the output of fault comparator 142 and switch a relay or switch circuit to the off position to interrupt the flow of power though the relay or switch circuit. CPLD 148 can include digital filter and latch 500 to receive the output of comparator 142 to filter out transients that are not meant to be faults before a fault is declared. CPLD 148 can also latch a fault condition and may be configured to send an interrupt to microprocessor 138 in response to the fault condition (e.g., being latched). If desired, the digital filter and/or latch can be omitted such that for example the output from comparator 142 (e.g., the current output signal of comparator 142) indicates the existence of fault and triggers output operations such as to disconnect power from the load (e.g., open a relay). Microprocessor 138 and CPLD 148 can be configured so that microprocessor 138 can toggle a bit in order to reset a fault condition detected by CPLD 148. CPLD 148 can contain an interface to microprocessor 138 and can contain registers to which microprocessor 138 can read or write (e.g., can write to one 8-bit read/write registers and read from three 8-bit read only registers).

Table 1 below provides illustrative examples of register definitions for CPLD registers, among others.

TABLE 1

CPLD Register Definitions.

| Signal | PIC IO | Definition |
|---|---|---|
| CLK | RC0 | Data is clocked in on the rising edge. |
| READ | RC2 | READ = 0 Data = Input / Read = 1 the DATA = output. |
| DATA | RC1 | Data bit Input/Output for CPLD |

Register Bit Definitions

| Register Name | Address b7 b6 | Bit Definition |
|---|---|---|
| Write Register Bits 0-5 only get updated when B7:6=00 | 0 0 | B0 = FAULT_ENABLE 0 = Fault detection disabled/1= Fault detection Enabled<br>B1 = Relay On Enable. 0 = disables Relay operation/ 1= Enables Relay Operation.<br>B2 = Relay Low Power Enable. 0 = Disables Low Power Mode/ 1 = Enables Low Power Mode. The CPLD drive a PWM signal through the Relay on Signal.<br>B5-2 = Read Back Capability Only<br>B7-6 = Read Register Address |
| Read Register 0 | 0 0 | B7-0 = Write Register |
| Read Register 1 | 0 1 | B3-0 = PLD Version Number<br>B7-4 = PCB Revision Number |
| Read Register 2 | 1 0 | B3-0 = Assembly Revision Number<br>B4 = Latched Fault Reset |

TABLE 1-continued

CPLD Register Definitions.

|  |  |  |
|---|---|---|
|  |  | B5 = External Interrupt |
|  |  | B6 = Relay On Signal |
|  |  | B7 = Latched Fault Detect |
| Read Register 3 | 1 1 | B7-0 = Write Register |

Figure 4B:
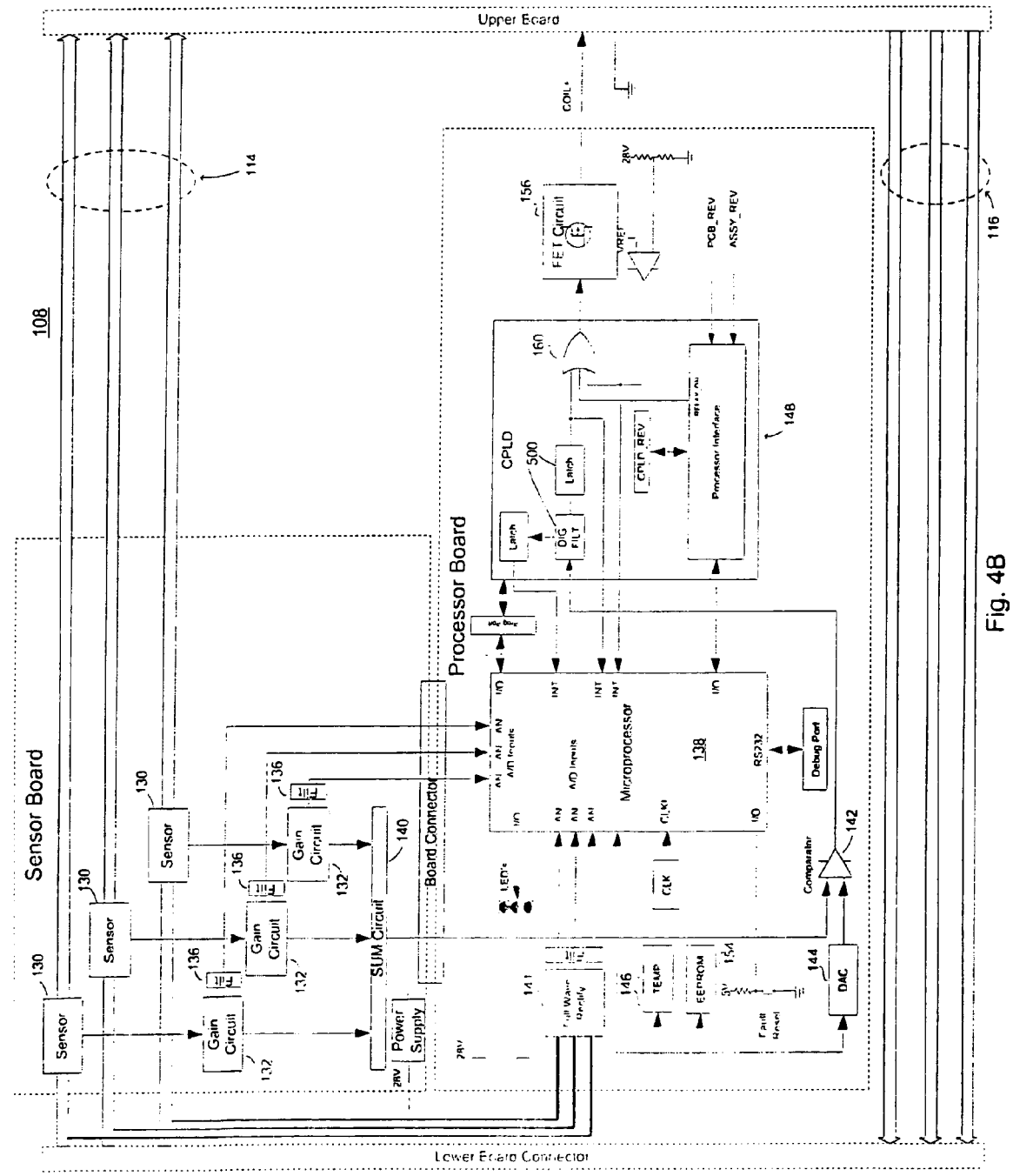
Figure 9:
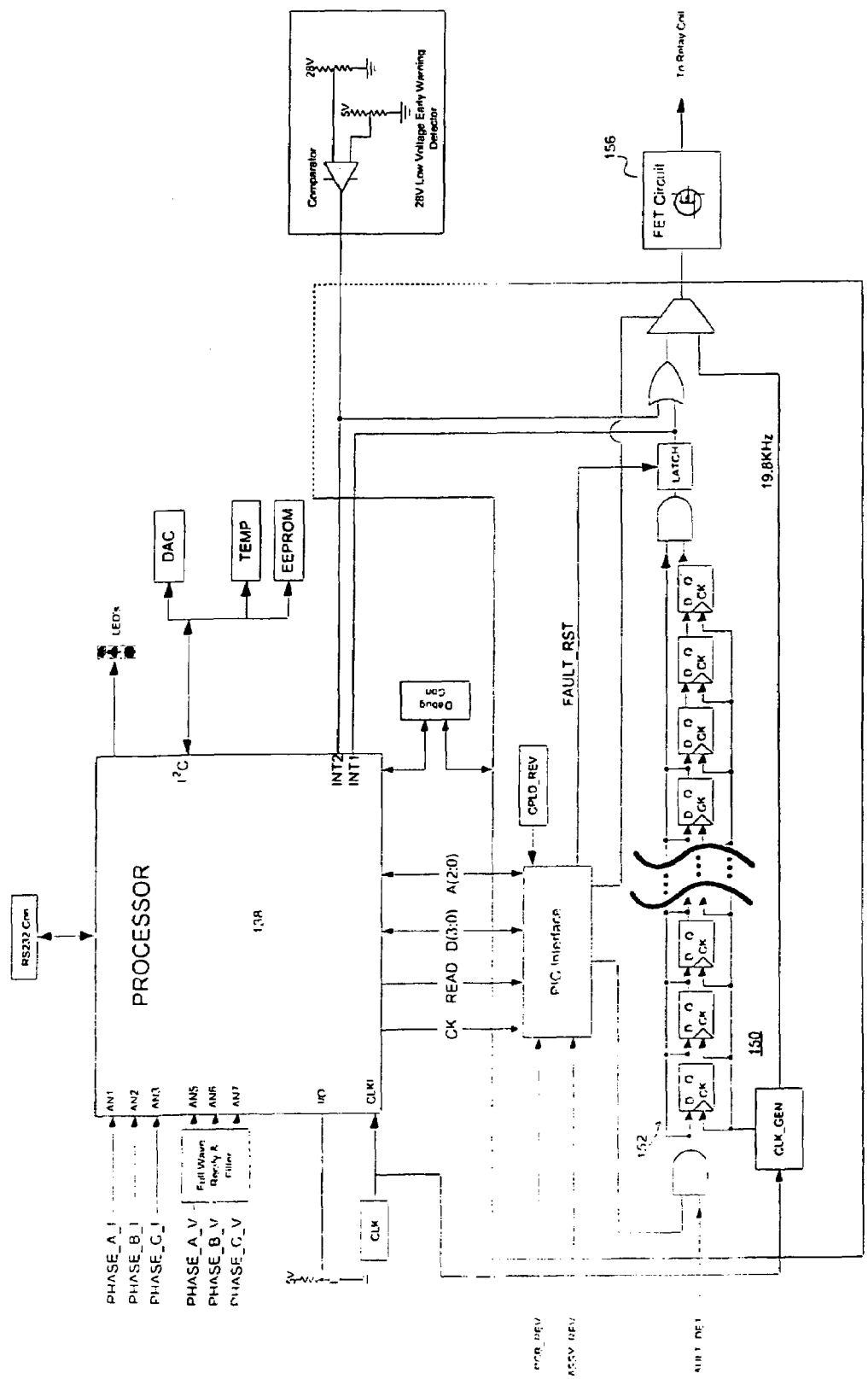
FIG. 9 is a functional block diagram of digital logic circuitry of a processor board in accordance with one embodiment of the present invention.

FIG. 9 shows a functional block diagram of an example of the digital signal processing circuitry which includes digital filter 150 of CPLD 148 and microprocessor 138 of FIG. 4B. Mentioned above. Digital filter 150 can be used to filter the fault detect signal received from analog comparator 142. Digital filter 150 of FIG. 9 is an example of an embodiment of digital filter and latch 500 of FIGS. 4A and 4B. As shown, digital filter 150 can include a latch if desired. As shown in FIG. 9, the sum value that determines when the system considers a fault to be valid for the purpose of interrupting power is programmable as is the frequency that drives the filter. As such, the system can be configured to only set a fault condition after a repeated number of (e.g., consecutive) fault inputs from comparator 142 and can be further configured to control the distance in between the timing of the detection of the faults by controlling the clock that controls when flip-flops 152 are cycled. Digital filter 150 may allow for programmable passbands. For example, the minimum pulse widths allowed to pass through the filter can be approximately around the following programmable passbands: 625 KHz, 9765.6 Hz, 4882.8 Hz, and 2441.4 Hz.

Digital filter 150 can be configured to perform an output activity (e.g., generate a signal) to interrupt power (e.g., by turning off a relay that connects power) when a fault whose duration is longer than a selected fault-detection duration setting of digital filter 150 (plus any inherent hardware latency in the equipment). For example, the fault-detection setting of digital filter 150 can be set to be about 100 μs, which means that in the given configuration a qualified fault will be detected if digital filter 150 receives input that indicates the existence of a fault (e.g., a high signal) for a period greater than 100 μs (e.g., during a period over about 100 μs, a high signal is received at each clock pulse). The chain of flip-flops as shown permits for the shifting of information or signal state at each clock pulse. Other fault detection duration settings may also be used. Other examples of duration settings for digital filter 150 can include 200 μs and 400 μs, which are fractions of a single half-cycle in a typical three phase power signal in an aircraft electrical system. As such, such systems and methods can be implemented to detect a condition having sufficient characteristics to indicate a transient fault in as quickly as, for example, about 100 μs to 400 μs in a 400 Hz power signal type and in relatively comparable proportional rates for other types of power signals.

In some embodiments, detection rates quicker than about 100 μs can be implemented which may if desired be as quick as about 1.6 μs. In digital filter 150, output from comparator 142 is the output signal from which the determination of the existence of a fault is determined. In one implementation as shown, digital filter 150 is configured to reset the state of all of its flip flops to a "no-fault" state when a new incoming signal showing the absence of a fault or an abnormal condition (e.g., a normal condition) is clocked into a flip flop from comparator 142. This configuration can for example be designed to filter for the existence of conditions that show a steady state for a period of time without noticeable intermittent fluctuations during that period of time. If desired, other techniques may be implemented. For example, circuitry may be configured (in parallel, in series, or in replacements of other filtering techniques) to detect multiple transient conditions that are individually too narrow to contain the energy of a fault, but when totalized over predetermined time intervals indicate sufficient energy density of a transient fault. For example, hardware (e.g. using digital filter and latch circuitry 500 of FIG. 4B), software (e.g., using microprocessor 138 and memory such as EEPROM 154 of FIG. 4B), or both can be configured to for example, indicate a fault condition (e.g., a qualified fault) when a majority of half cycles in a selected time interval (e.g., 10 ms, which corresponds to 8 half cycles at 400 Hz) include a transient fault (e.g., 5 out of 8 half cycles show faults). Other examples can involve using about a 100 ms interval (which corresponds to 80 half-cycles at 400 Hz) and indicating the existence of a sufficient fault condition exists when it is determined that about 40% of the half cycles show the existence of a transient fault. Another example can involve using about a 1 s interval (which corresponds to 800 half-cycles at 400 Hz) and indicating that a sufficient fault condition exists when it is determined that about 25% of half-cycles show the existence of a transient fault. The latch shown in FIG. 9 can be used to hold the output state of the output of the flip-flops until for example the latch is reset by the PIC interface.

Temperature sensor 146 of FIG. 4 has a serial interface (or other type of interface) and can, for example, be located near the center of fault interrupt circuitry 108 or a board therein. Microprocessor 138 can periodically monitor the temperature. This information can be saved in history records and can, for example, be used to compensate for performance variations of the circuitry due to temperature variations. If desired, temperature measurements can also be used to shut off fault interrupt circuitry 108 when the temperature is above or below certain thresholds.

Fault interrupt circuitry 108 can include memory such as EEPROM 154 and, for example, memory on-board microprocessor 138, and/or other type of memory device. Such memory can be used to store software, history information, parameters, etc.

Digital to analog converter 144 can be used to set the threshold level on the fault comparator. The value will be a setting that is saved in the parameter file and can be adjusted depending on the characteristics of the load.

If desired, there will be a momentary pushbutton switch in fault interrupt circuitry 108 to be used for resetting a fault condition. Once a fault is detected it preferably remains latched by CPLD 148 until, for example, the fault is reset using the pushbutton or some other switch. Other techniques for a reset may also be applied.

Microprocessor 138 can include analog to digital converters or such circuitry that may be internal or external to microprocessor 138 for converting the RC filtered full-wave rectified signals received from FWR/gain circuits 132 to digital signals for use in analysis by microprocessor 138.

As shown in FIG. 4, a portion of the circuitry is arranged on one board, which is referred to as the sensor board, and other portions are arranged on another board, which is referred to as the processor board. Other arrangements can also be used. FIG. 4 also shows a lower board connector and upper board connector that are used by circuitry 108 to, for example, connect the circuitry to a switch or relay and a power bus. Fault interrupt circuitry 108 can include FET circuit 156 for applying a sufficient signal to a relay or switch to open the relay (e.g., using a coil or transformer). In the open condition, FET circuit 156 may generate a pulse-width modulated signal to maintain the status of the switch and to reduce the amount of heat generated from such activity. In this arrangement, the relay can be opened by removing power from the output of FET circuit 156. Other arrangements may also be contemplated in which a different arrangement for opening or closing a relay or switch may be used.

Figure 10:
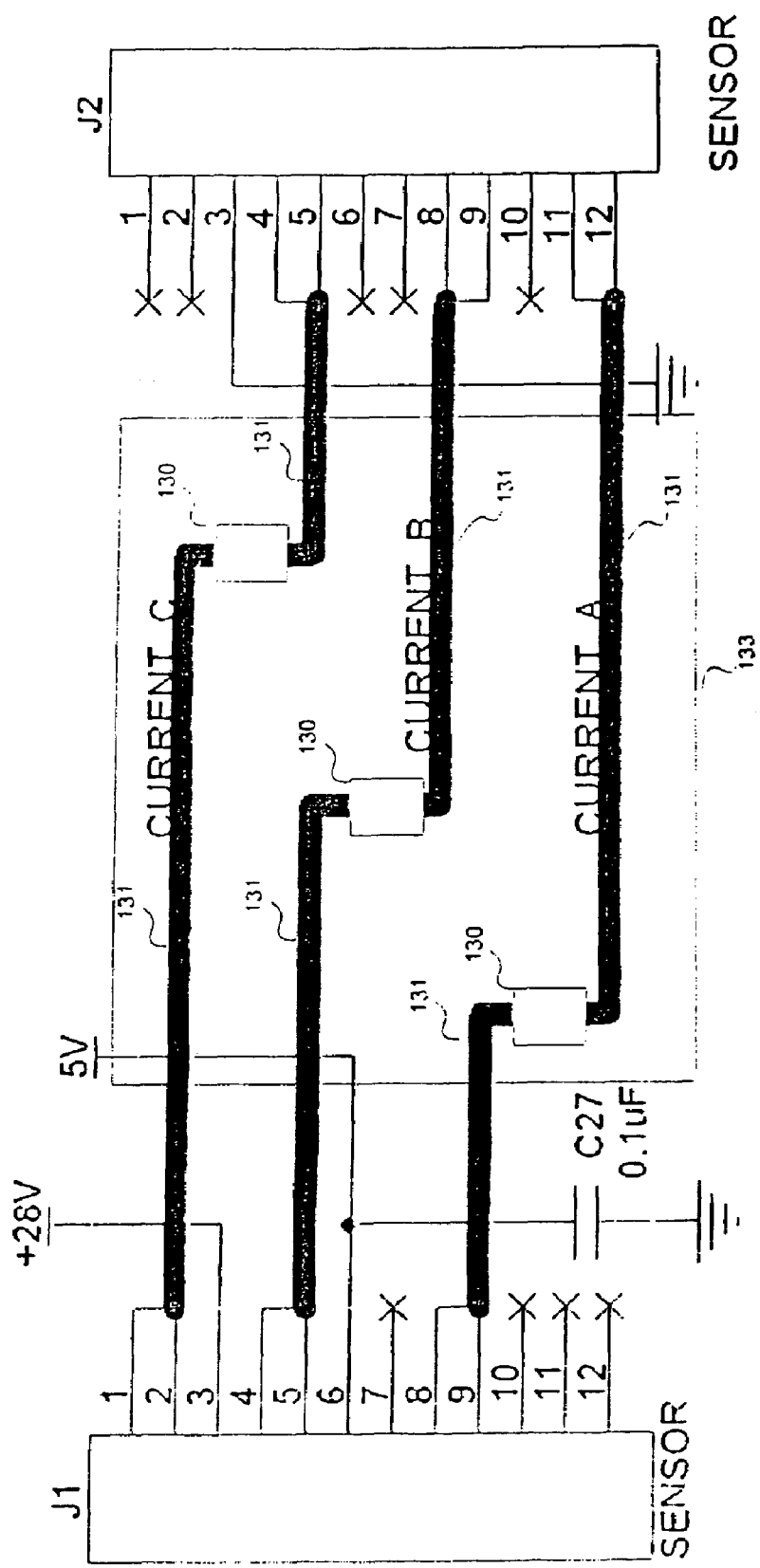
FIG. 10 is a wiring diagram of traces for power conductors for sensing in sensor circuitry in accordance with one embodiment of the present invention.

FIG. 10 shows an illustrative physical arrangement for the placement of Hall sensors 130 in relation to each other and in relation to each phase that respective Hall sensors are monitoring. As shown, each Hall sensor 130 is positioned over a conductor carrying a phase of interest. The conductors for the three phases are arranged in "dog-leg" fashion, which can more accurately be considered a z-shaped pattern such that electromagnetic radiation emanating under the Hall sensor is perpendicular to the majority of the three power traces coming to/from connector J1 and does not interfere with any portion of the conductors that are being monitored by the other Hall sensors 30. Such an arrangement as shown in FIG. 10, is shown to provide unexpected beneficial results in improving the sensing capabilities of Hall sensors 130 when closely arranged on a circuit board. In such an arrangement, the measurement technique is oriented 90 degrees to the normal current flow. As such, in the illustrative physical arrangement of FIG. 10, a box z-shaped pattern is provided where Hall Effects sensors 130 and the current trace traveling under the Hall sensors 130 is 90 degrees to incoming and outgoing trace lines 131 as arranged on a support 133 (e.g., printed circuit board). The three phase in/out lines 131 and sensors 130 should be separated as far apart as possible on support 133 to minimize magnetic inductive cross-talk. As shown, Hall sensors 130 are preferably placed such that they are oriented perpendicular to main lines 131. Phase A, B, and C are also shown to be arranged in sequence. However, different arrangements may also be used such as to arrange phase C to be in between phase A and B.

Fault interrupt circuitry 108 of FIG. 4 can be configured to detect at least three types of current faults and can be configured to detect such faults using two different mechanisms. The primary mechanism can be in hardware that uses voltage comparator 142. The DAC voltage of DAC 144 can be set to an optimal level (e.g., 0.4V) and the output of comparator 142 may be configured to be supplied to CPLD 148, which in turn, may generate an external interrupt for microprocessor 138. Microprocessor 138 can continue to monitor the analog inputs (e.g., RC filtered full-wave rectified signals from FWR/gain circuits 132) to determine the type of fault that has occurred.

Hardware fault interrupt sensitivity in the illustrative examples provided herein is based on a differential between phase currents. Hardware fault sensitivity is for example set based on a fault current equivalent to a 50 Ohm load resistor placed between phases or phase-to-ground (i.e. a sensitivity equivalent to the current through a 50 Ohm resistor for detecting line-to-line and line-to-ground arcs as unbalanced currents). For example, in a 115/208 VAC three phase system, this is about 4.16 A rms line-to-line or about 2.40 A rms line-to-ground. Hardware detection circuitry or analog signal processing circuitry may be coupled to a digital filter (e.g., digital filter and latch circuitry 500, digital filter 150) to block nuisance conditions from tripping the switch 156 to disconnect power. For example, as mentioned above, digital filter and latch circuitry 500 can be configured to indicate the existence of a fault when the arc duration exceeds beyond the threshold of a pre-selected fault detection duration setting and the arc current magnitude exceeds a magnitude threshold. Digital filter and latch circuitry 500 can for example be configured to block all other conditions from triggering a fault.

In one specific example, a setting of 200 µs is selected for the fault detection duration setting with a 50 Ohm equivalent arc hardware setting as mentioned above. A 50 Ohm equivalent arc at the peak of a half-cycle, e.g., 400 Hz, to ground can be characterized as a rectangular pulse >200 µs wide, >3.2 Apk, at the peak line voltage of 163V. The instantaneous power of this pulse is 528 W. The energy of a single arc is then equal to approximately 110 mJ, because of the duty cycle of ~200 µs/1.0 s. As the wire deteriorates and the arc reaches this level of energy, a hardware fault is detected and signaling to interrupt power is generated. In this example, in the worst-case, there will be an arc at each half-cycle of 400 Hz until the relay actually opens its contacts. This is a train of 24 arcs separated by 1.25 ms, each carrying 0.11 J of energy, or approximately 2.6 J total energy.

As shown, fault detection schemes can be provided that are redundant, independent, and operate in parallel (e.g., in real time as faults arise) by using the outputs of sensors 130 in two different fault detection processes with each providing outputs that can trigger the interruption of power to the load. This scheme can for example increase reliability in product operation and fault detection. A second mechanism to detect faults can preferably use software that is implemented on microprocessor 138 for such analysis. Microprocessor 138 can be used to monitor the voltage levels on the analog inputs (e.g., RC filtered full-wave rectified signals) from FWR/gain circuits 132. The voltage level of these inputs should be proportional to the current flowing in each of the 3 phases of the AC power that are sensed by Hall sensors 130.

In one illustrative embodiment, the fault monitoring software is programmed to begin as soon as the relay or switch that is associated with fault interrupt circuitry 108 for distributing power is turned on, while the fault monitoring hardware is configured to begin at a startup time (Tsu milli-seconds) after the relay or switch is switched on. For example, this set startup time may be needed to allow the device that is powered by the three phase power to reach a given operating condition (e.g., a motor to spin up) before the fault monitoring hardware is activated. Current levels in the 3 phases during startup may falsely appear as fault currents to the hardware (e.g., comparator 142 and related circuitry), but the software can be configured to adjust its minimum and maximum parameters to accommodate the known startup conditions of the load.

Analog inputs to microprocessor 138 that are RC filtered and full wave rectified by FWR/gain circuit 132 can be applied to analog inputs "AN" of microprocessor 138.

Figure 28:
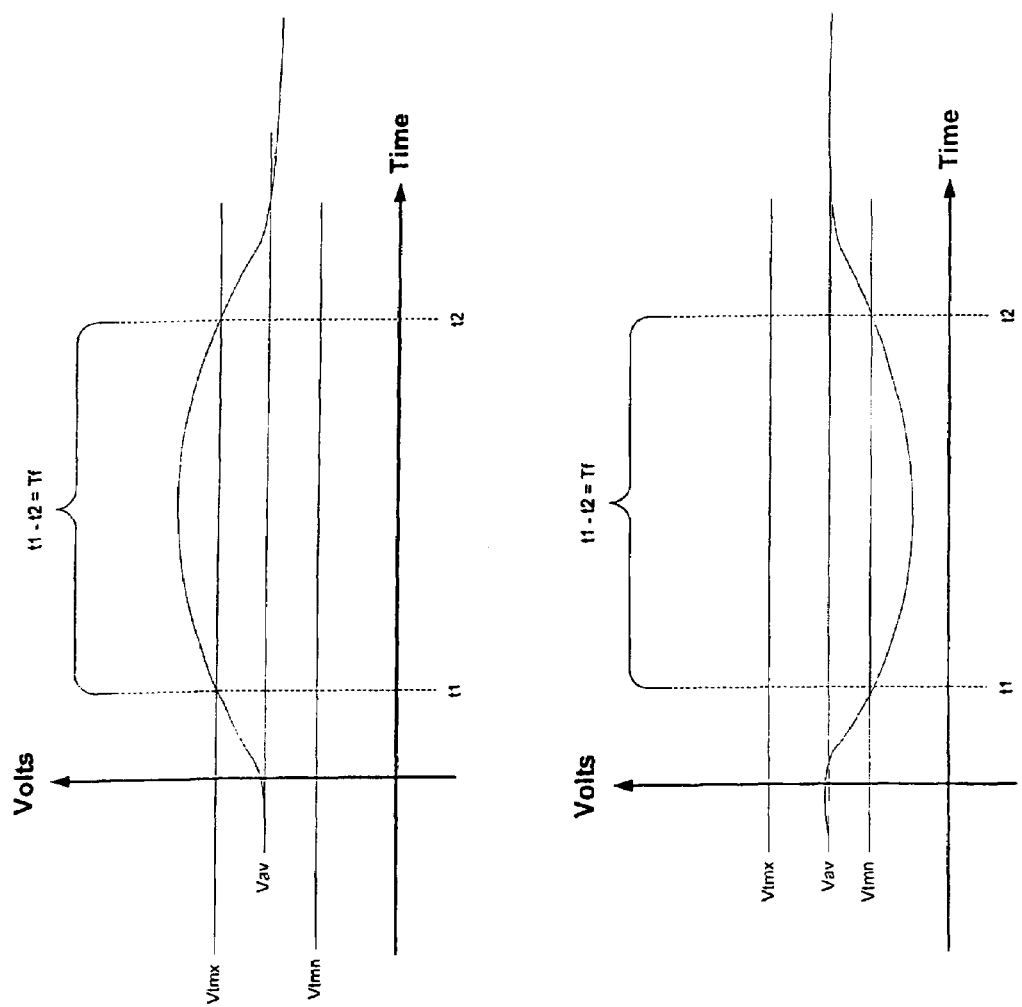
FIG. 28 shows graphs of illustrative threshold levels for detecting faults in accordance with one embodiment of the present invention.

Analog Inputs on microprocessor 138 can be monitored for programmed voltage thresholds Vtmx & Vtmn (FIG. 28) which can occur for a specific programmed time duration Tf.

If any of the these voltage inputs are above Vtmx for a time dTmx or below a time Vtmn for dTmn, a fault can be declared and a bit will be set in EEPROM 154, a signal to drive AND gate 160 is generate to open the relay or switch, and appropriate LED signals may also be driven high to lightfault indicator LED(s). Each type of fault can have a particular definition for Vav, Vtmx, Vtmn, dTmx, and dTmn. dTmx and dTmn will be specified in number of samples while Vtmn and Vtmx can be specified in millivolts. The table below provides illustrative definitions and default values for the variable parameters that may be used for fault detection for one exemplary embodiment.

| Name | Parm # | Description | Range All 16-Bit Values | Default A Phase Value | Default B Phase Value | Default C Phase Value |
|---|---|---|---|---|---|---|
| Vtmx | 0 | Voltage Threshold Maximum. Units are Vcc/1023 volts. | 0-Vcc | 1 | 1 | 1 |
| Vtmn | 1 | Voltage Threshold Minimum. 0 means not enabled. Units are Vcc/1023 volts | 0-Vcc | .1 | .1 | .1 |
| Vtmxb | 2 | Voltage Threshold Maximum before Tsu. Units are Vcc/1023 volts. | 0-Vcc | 1 | 1 | 1 |
| Vtmnb | 3 | Voltage Threshold Minimum. before Tsu 0 means not enabled. Units are Vcc/1023 volts. | 0-Vcc | .1 | .1 | .1 |
| Dab | 4 | Difference between Phases A & B. Units are Vcc/1023 volts. | 0-Vcc | | 0.5 V | |
| Dac | 5 | Difference between Phases A & C. Units are Vcc/1023 volts. | 0-Vcc | | 0.5 V | |
| Dbc | 6 | Difference between Phases B & C. Units are Vcc/1023 volts | 0-Vcc | | 0.5 V | |
| Vdac | 7 | DAC Voltage. The DAC voltage goes to a Comparator and all type of faults will cause the analog input to the DAC to go above the set voltage. Units are Vcc/1023 volts | 0-Vcc | | 0.4 V | |
| Tsd | 8 | Start Delay Time. Minimum amount of time that power must be stable on all 3 phases before software considers the system ready for startup. | 50 ms-1 s | | 200 ms | |
| Fav | 9 | Fault Averaging. Two parameter that give a number and a total that is the number of faults out of a total number that will declare a minor fault has occurred. Example: 4/7 would mean that 4 of any 7 consecutive samples are faults and a minor fault will be declared. Even if the Tf is not satisfied. | 1 sample | | 2/3 samples | |
| Tf | 10 | Minor Fault Timing Threshold or Delta T Maximum. This is the number of samples in a row that must occur in order to declare a fault. A value of zero means the software never declares a fault. | 1 sample | | 2 samples | |
| Tmax | 11 | The maximum temperature value that the temp sensor can be before a fault is detected. If the Min and Max values are set equal then the temp value will never cause a fault. Units are degrees Centigrade | 1° C. | | 85° C. | |
| Tmin | 12 | The minimum temperature value that the temp sensor can be before a fault is detected. Units are degrees Centigrade | 1° C. | | −40° C. | |
| Tclr | 13 | Operating time with no fault before minor fault counter is cleared. Units are milli-seconds | 5 | | 5 Min | |
| Tsu | 14 | Time at Startup that the Hardware Fault Detection is not monitoring the Current for the faults because of Motor Spin up. The Software will also not enable the hardware fault detection until this time has expired. units are milli-seconds | 1 mS resolution | | 250 mS | |
| NMF | 15 | Number of Minor Faults required to determine a major fault. A setting of 255 means infinite number of minor faults. This means a re-power will always reset the fault. A setting of 0 means that a power cycle will never reset the fault. | 1 Fault | | 3 Minor faults | |
| NSF | 16 | Number of System Integrity Faults. | 1 Fault | | 0 | |
| Vdm30 | 17 | DAC Voltage for Temperature range −35° C. to −26° C. The DAC voltage goes to a Comparator and all type of faults will cause the analog input to the DAC to go above the set voltage. Units are Vcc/1023 volts. | 0-Vcc | | −29.4 mV | |

-continued

| Name | Parm # | Description | Range All 16-Bit Values | Default A Phase Value | Default B Phase Value | Default C Phase Value |
|---|---|---|---|---|---|---|
| Vdm20 | 18 | DAC Voltage Temp −25° C. to −16° C. Correction. | 0-Vcc | | −24.5 mV | |
| Vdm10 | 19 | DAC Voltage Temp −15° C. to −6° C. Correction. | 0-Vcc | | −19.6 mV | |
| Vd0 | 20 | DAC Voltage Temp −5° C. to 4° C. Correction. | 0-Vcc | | −14.7 mV | |
| Vd10 | 21 | DAC Voltage Temp 5° C. to 14° C. Correction. | 0-Vcc | | −9.8 mV | |
| Vd20 | 22 | DAC Voltage Temp 15° C. to 24° C. Correction. | 0-Vcc | | −4.9 mV | |
| Vd30 | 23 | DAC Voltage Temp 25° C. to 34° C. Correction. | 0-Vcc | | 0 mV | |
| Vd40 | 34 | DAC Voltage Temp 35° C. to 44° C. Correction. | 0-Vcc | | 4.9 mV | |
| Vd50 | 25 | DAC Voltage Temp 45° C. to 54° C. Correction. | 0-Vcc | | 9.8 mV | |
| Vd60 | 26 | DAC Voltage Temp 55° C. to 64° C. Correction. | 0-Vcc | | 14.7 mV | |
| Vd70 | 27 | DAC Voltage Temp 65° C. to 74° C. Correction. | 0-Vcc | | 24.5 mV | |
| Vd80 | 28 | DAC Voltage Temp 75° C. to 84° C. Correction. | 0-Vcc | | 29.4 mV | |

The system can be configured to include two types of faults, a minor and a major fault. A major fault can be of the type that can only be reset by the use, for example, of the reset button. A minor fault can be of the type that can be reset when power is recycled. When a predetermined number of minor faults has occurred, a major fault will be declared. The table above includes illustrative examples of definitions for the programmable parameters.

When a fault is detected the software may determine what type of fault has occurred. Once the type of fault is determined, the software may light the LEDs as shown in the illustrative arrangements specified below based on the examples of fault type definition also provided below:

Fault Recognition Determination Table.

| Fault Type | Definition |
|---|---|
| Ground Fault | One phase or all phases have current over Max spec |
| Line to Line Fault | Any two but only two phases have current over Max spec |
| Open Fault | One or more lines go below the threshold. |

If a combination of the conditions occurs, or a condition not specified in the table causes a fault, all LEDs can be illuminated.

LED Fault Definitions.

| Fault Type | LED A | LED B | LED C |
|---|---|---|---|
| No Fault | OFF | OFF | OFF |
| Ground Fault A | ON | OFF | OFF |
| Ground Fault B | OFF | ON | OFF |
| Ground Fault C | OFF | OFF | ON |
| Ground Fault A, B & C | ON | ON | ON |
| Line-2-Line Fault AB | ON | ON | OFF |
| Line-2-Line Fault BC | OFF | ON | ON |
| Line-2-Line Fault CA | ON | OFF | ON |
| Arc Fault A | Blink | OFF | OFF |
| Arc Fault B | OFF | Blink | OFF |
| Arc Fault C | OFF | OFF | Blink |
| Arc Fault A & B | Blink | Blink | OFF |
| Arc Fault B & C | OFF | Blink | Blink |
| Arc Fault C & A | Blink | OFF | Blink |
| Arc Fault A, B & C | Blink | Blink | Blink |
| Differential AB | ALT Blink | ALT Blink | OFF |
| Differential BC | OFF | ALT Blink | ALT Blink |
| Differential CA | ALT Blink | OFF | ALT Blink |
| System Errors | Alt Blink | Alt Blink | ON |
| Temperature Fault | Alt Blink | ON | Alt Blink |
| Undetermined Hardware Fault | ON | Alt Blink | Alt Blink |

The system may record a limited amount of data that can be recalled and retrieved from the circuitry for analysis. The table below provides illustrative examples of history records that may be saved.

| Saved Value | Definition |
|---|---|
| Imax A | Maximum Current read from Phase A. Saved in RMS Amps. |
| Imax B | Maximum Current read from Phase B. Saved in RMS Amps. |
| Imax C | Maximum Current read from Phase C. Saved in RMS Amps. |
| Imin A | Minimum Current read from Phase A. Saved in RMS Amps. |
| Imin B | Minimum Current read from Phase B. Saved in RMS Amps. |
| Imin C | Minimum Current read from Phase C. Saved in RMS Amps. |
| Iavel A | Average Current read from Phase A in the 1st 50 power cycles. Saved in RMS Amps. This is a running average. It take a new reading and adds to the old reading and divides by 2. |

-continued

| Saved Value | Definition |
| --- | --- |
| Iave1 B | Average Current read from Phase B in the 1st 50 power cycles. Saved in RMS Amps. This is a running average. |
| Iave1 C | Average Current read from Phase C in the 1st 50 power cycles. Saved in RMS Amps. This is a running average. |
| Iave2 A | Average Current read from Phase A in the last 50 power cycles. Saved in RMS Amps. This is a running average. |
| Iave2 B | Average Current read from Phase B in the last 50 power cycles. Saved in RMS Amps. This is a running average. |
| Iave2 C | Average Current read from Phase C in the last 50 power cycles. Saved in RMS Amps. This is a running average. |
| NMNF | Number of Minor Faults Detected. |
| NMJF | Number of Major Faults Detected. |
| NPC | Number of Power Cycles |
| OT | Operating Time - The length of time that the unit has been powered up. This will be in Hours rounding off to the half hour. |
| PT | Power Time - The length of time that the relay has been switch on. This will be in Hours rounding off to the half hour. |
| Tmax/PC#/Hrs | The Maximum Temperature reached. Stored with 1 degree accuracy. |
| Tmin/PC#/Hrs | The Minimum Temperature Reached. Stored with 1 degree accuracy. |
| Fault time | Time at which a fault occurred |

History records may be valuable in characterizing slow drifts and obtaining information on a number of different aspects such as frequency of fault, reliability of certain equipment, expected life span, etc.

If desired as shown in FIG. 4B, fault interrupt circuitry 108 may include voltage level sensing circuitry 141 that for example is shown to include a plurality of conductors that are connected to a corresponding one of each phase of power line 114, FWR circuitry to full-wave rectify the signal on those conductors, and filter circuitry to remove nuisance conditions or other noise from the FWR output signal. Nuisance conditions are, for example, transient conditions that if not filtered properly would be detected and characterized as some type of fault. Filtering as illustratively described herein can be implemented to avoid misinterpreting such transient conditions as fault conditions. Voltage level sensing circuitry 141 is shown to have analog outputs which supply an analog input to microprocessor 138 to monitor voltage levels as an additional factor in software based fault detection. In such embodiments, software fault detection is based on a lower and upper limit of absolute phase current and absolute phase voltage monitored (e.g., continuously monitored) on each of the three phases. As shown, the software detection monitors 6 DC voltages, three of which are analogs of the phase currents and three of which are analogs of the phase voltages. Upper and lower limits can be set for each to discriminate between normal line and load behavior and fault events. Such software can, for example, analyze the six values in milliseconds following a hardware fault, and if desired, will be configured to either allow or disallow the relay to trip based on whether the fault is valid (e.g., as a means to filter nuisance conditions from signaling the interruption of power).

Simultaneous monitoring of phase voltages can for example be advantageous at the application of power to a load such as a pump motor. After application of power (e.g., 28 VDC) to fault interrupt circuitry 108, fault interrupt circuitry 108 can be configured to delay the output operation to connect power to the load (e.g., by closing the relay) until all three phase voltages of a three phase power line are valid (e.g., between upper and lower threshold limits). The voltage levels can be monitored using for example voltage level sensing circuitry 141 of FIG. 4B. This technique can protect the load from line transients or a missing phase. Once power is applied to the load and the load is operating, the steady-state voltages can be monitored as well as the currents. In such embodiments, the software detection scheme has six values available to it in order to determine the validity and to properly classify a fault. Voltage information can be beneficial in recognizing power transients in particular applications such as in aircrafts, which commonly generate transients under normal and abnormal flight conditions. Fault interrupt circuitry 108 can be configured to recognize and not allow such nuisance type conditions.

Figure 11:
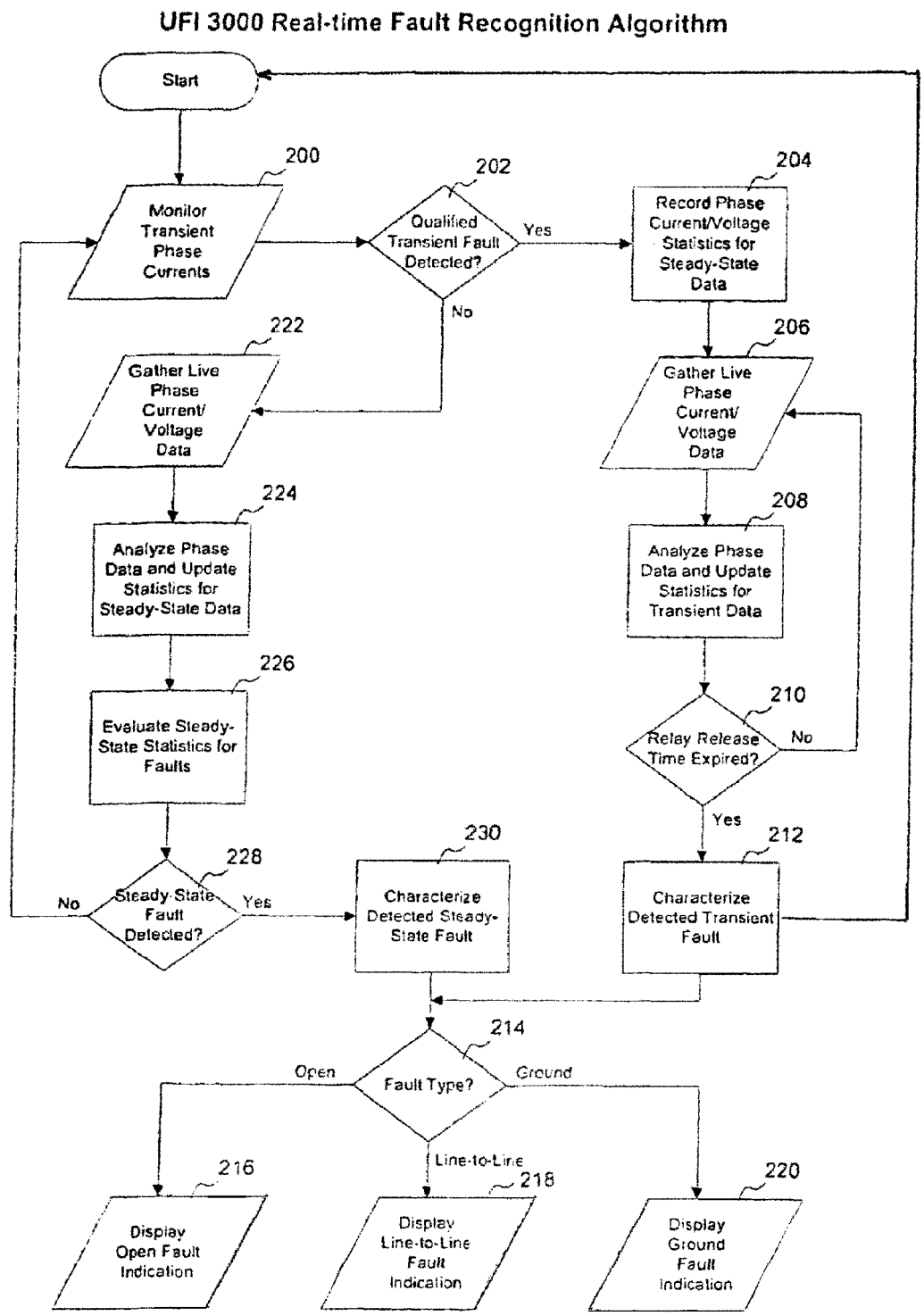
FIG. 11 is a flow chart of illustrative steps involved in detecting and identifying faults in accordance with one embodiment of the present invention.

Fault interrupt circuitry 108 can be configured using software and related circuitry to detect faults in accordance with the illustrative steps shown in FIG. 11. Software based fault detection and hardware based fault detection may be configured to detect the same types of faults (e.g., while operating independently in parallel) such as to detect ground type faults (e.g., a high current detected on or more phases of a three phase power line), line-to-line type faults (e.g., a high current detected in two phases of three phase power line), an open type fault (e.g., a low current detected in one or more phases of a three phase power line), an arc type fault (e.g., a high energy short duration event), and an imbalance type fault (e.g., a condition in which the current of any phase of a multi-phase system becomes higher or lower than the average current by a certain minimum amount, which can be the current running through a 50 Ohm load). Transient faults can be categorized into two different types of faults comprising series faults and parallel faults.

Other ways of categorizing faults types may also be used. In addition to the type of faults that can be considered transient faults, which itself includes different types of transient faults (e.g., a ground fault, open, etc.), there may be other types of faults such as steady-state (or drift) faults. A steady state type fault can for example be of the type in which a high current is detected in all three phases of a three phase power line as a steady state condition, which can indicate that the pump motor is beginning to show signs of failure. Steady state faults are primarily detectable using software based fault detection. At step 200, transient phase currents of power signals on conductors can be monitored. At step 202, fault interrupt circuitry 108 can detect the existence of a transient fault (e.g., using hardware fault detection circuitry) as for example illustratively described herein.

As mentioned above, faults can be categorized in different ways such as series and parallel faults. Series faults can include short circuits within a pump motor winding and open faults. Series faults typically occur in series with the path of circuit current. Series faults are sometimes also referred to as open faults. Series faults are complete or intermittent opening of the conductive path. In a three phase power line, an open fault on one of the lines can create a fault condition. For example, a three-phase motor can overheat and seize with a missing phase. An open can cause an imbalance that the hardware detection scheme detects and initiates power interruption. The software can for example be configured to detect the drop in phase current and/or voltage and power interruption to continue to completion. Arcs are another type of fault that can be detected and identified. For example, in aircraft wiring under in-flight vibration, an intermittent open such as a loose connector contact, can produce arcs each time the conductors pull apart due to the high load inductance of the load. These arcs can build up carbon and continue to make the arc worsen. Fault interrupt circuitry 108 is for example configured to be sensitive to the arc.

Parallel faults include line-to-ground faults, line-to-line wiring faults, and shorts within windings. Parallel type faults as opposed to series type faults can for example include line-to-line and line-to-ground faults: Parallel faults occur in parallel with (across) the path of circuit current. These include direct or resistive connections between a line and ground, or between two lines (phases). Since these types of faults are "driven" by the source they persist and can be considered dangerous.

As mentioned above, threshold values or settings can be used as the basis for an electric fault. For example, the threshold can be set to 50 Ohm for line-to-line, line-to-ground, imbalances, or any other types of faults as desired. This example setting can be understood to indicate that it has the sensitivity to detect a fault if any phase behaves as if it is leaking current to another line or to ground through a 50 Ohm load. This example is applicable to series windings faults and arcs.

In the particular application aircraft boost pump motors, one particular fault type is sometimes referred to mistakenly as a "series short." Motor windings can over time break down internally with heat, and arcs can occur from one layer of winding to another. This will tend to make one phase winding intermittently look shorter than the other two and unbalance the phase currents. In a 4-wire system, where the junction of the phases is tied to ground or back to the source via a neutral wire, this fault is indistinguishable from a ground fault, because it looks like an impedance to neutral or ground across the affected phase, and it will be identified as a ground fault. However, in a 3-wire system there will be excessive current in the affected phase, which can split through the other two phases back to the source. Fault interrupt circuitry 108 can detect this as a fault (e.g., a parallel type fault). Thus, at step 202, such different types of faults can be detected. Also at step 202, transient faults that are detected may be filtered to eliminate nuisance conditions from the detected transient faults as for example illustratively described herein. Nuisance conditions can be detected faults that do not meet certain criteria indicative of a fault condition of concern. Filtering nuisance conditions may include signal processing to evaluate signal characteristics to identify detected faults and block nuisance conditions from interrupting power to the load. Such filtering can include analog filters, digital filters, software filters, or combinations thereof. Filtering may also include identifying repeated faults in a limited period of time to identify major faults.

In response to the detection of a qualified fault, a signal can be immediately generated to open a power relay or switch. Depending on the configuration, the signal to open the power relay or switch is generated when a major fault is detected or in response to other fault conditions. At step 204, in response to the detection of a qualified fault, phase current and/or voltage statistics can be recorded. At step 206, live phase current/voltage data can be gathered or stored for analysis. At step 208, the gathered phase currents/voltages can be analyzed and statistics for the phase currents/voltages may be updated. At step 210, it is determined whether the time for the release (opening) of the relay or switch in response to the detected fault has expired. If the duration has not expired, steps 206 to 210 are repeated until the duration expires. At step 212, based on the information collected in steps 206 and 210 after the fault was detected, the transient fault that was detected can be characterized.

As mentioned above, at steps 204 and 206, power signal data can be collected, one sample at a time, in a database which can for example be continually updated at a frequency that is a multiple of the natural frequency of the power if the power signal is AC power (e.g., sampling the power signal at about 3200 cycles-per-second). In the database, the instantaneous rectified current for each phase and the instantaneous rectified voltage for each phase can for example be recorded at every frequency-multiple interval. If desired, when a power anomaly is detected, and the signal is generated to interrupt power, software on-board the circuitry can continue to collect power signal data for a period of time, which can be sufficiently less than the time to completely disconnect power (e.g., open a mechanical relay) to allow for restoring or stopping the disconnection of power in the event that the power anomaly fails to qualify as a fault. In order to characterize a power anomaly, to properly assess a fault condition, the power signal can for example be analyzed by one or more methods. For example, stored voltage data (e.g., each instantaneous voltage level) representing sensed current and/or voltage levels can be examined and compared to upper and lower limits. If the voltages exceed the upper or lower limits, the power anomaly can be disqualified as a fault and normal operation resumes.

This conclusion can for example be because the voltage conditions are consistent with the detected current conditions indicating a normal condition such as during power up or power down of the load. If the stored voltage data are within the upper and lower limits, stored current data (e.g., the instantaneous currents) are analyzed. Stored current data (e.g., each stored instantaneous current data) is examined and a database of integrals is accumulated and analyzed. A three row by three column array database can for example be created, in which each row represents one of the three phases of the power line and each column represents a variable interval of time. Each array element can contain two values: the integral of the current signals (e.g., instantaneous rectified current signals) that are greater than the average current (hereby called the "positive" integral) and the integral of the current signals (e.g., instantaneous rectified current signals) that are less than the average (hereby called the "negative" integral).

The interval of time used to integrate over can for example be variable and can for example be determined by computing the absolute difference between the two integrals in an array element and evaluating whether or not one of the integral values is greater than ten-times the other integral value of the pair. Each time a new current value is acquired, it is integrated into the running value and the difference is then taken. If desired, any instance of a ten-times difference in any phase (i.e. any row) stops the integration process for that column and causes the next column to be used. The previous columns integrals can be copied row by row to the second column and the integration is allowed to continue. This process can continue until all three columns have been created or the total number of samples in the power signal database have been exhausted, in which case all three columns are created at once with the same integral values.

Thus when complete, each array element contains a positive and negative integral of the current for a particular phase (determined by the row) during a particular interval of time (determined by the column). The database of integrals can for example be analyzed by comparing pairs of integrals in each column to characterize the first anomaly event and then to identify a secondary and a tertiary anomaly if they exist. For example, the first anomaly to be characterized results from determining which integral has the greatest magnitude in the first column of an array in a database of integral pairs. If two or more anomalies occur simultaneously, the anomaly with the greatest magnitude will be considered the first. If two or more anomalies occur simultaneously and more than one has the same magnitude, the first one examined will be considered. Secondary and tertiary anomalies can be assessed by evaluating the remaining two columns of an array in a database of integral pairs for similar magnitude and duration attributes (e.g., magnitude within ±30%, total duration within ±50%).

From a minimum of one to a maximum of three anomalies are characterized, the resulting sign (negative or positive) for each dominating integral determining the fault type: either open or short. The determination of an open or short combined with the phases that the short or open occurred can further yield what type of fault occurred. FIG. 29 includes examples of some of possible characterizations using the example 3×3 array and techniques illustratively described herein. The available faults types in this implementation include open fault phase A and/or phase B and/or phase C, Line-to-ground on phase A and/or phase B and/or phase C, line-to-line fault between phases A-B, A-C, or B-C. In these examples, the software can be configured to use time columns that do no represent equal amounts of integration time (e.g., Time 1 can be less than or greater than Time 2). However, if desired, equal time intervals may also be used.

Using unequal time intervals can allow for the identification of how long negative or positive spikes are occurring. If desired, other techniques can also be implemented to characterize faults as part of performing step 212 (e.g., using a different magnitude other ten times the comparison). Such characterization techniques can if desired, also be applied to detect the existence of a fault.

At step 214, the particular fault type at hand can be identified from transient fault characterization of step 212. As such, detected faults can be characterized to be one of a number of different types of faults. At step 216, 218, and 220, appropriate displays can be generated to inform a technician or other individual of the type of fault that was detected. If at step 202, a transient fault is not detected, fault interrupt circuitry 108 can be monitored for steady-state faults as opposed to transient faults. Steady-state faults are, for example, slow gradual changes in signal characteristics that overtime indicate the existence of a fault or problem. For example, physical wear in a device that is being supplied power that is being monitored by fault interrupt circuit 108 can be reflected in slow changes in the characteristics of the power signal. Such information if recorded can provide sufficient detail for estimating or identifying an expected rate of wear or expected malfunction of devices.

At step 222, live phase current/voltage data can be gathered. At step 224, the gathered phase current/voltage data can be analyzed and steady-state statistics may be updated. Statistical data gathered during operation may be updated periodically, in real time, or in another suitable way. At step 226, steady-state statistics can be evaluated for the purpose of detecting steady-state faults. At step 228, it is determined whether a steady-state fault has occurred. A steady state can be reflected form the statistical data collected overtime which will indicate from the gathered electrical characteristics the current condition of a load (e.g., level of wear in a motor), the existence of a fault, the expected lifetime of circuit components including mechanical components, or other conditions that can be detected from a gradual variation in the electrical characteristics of an electrical system over time. If a steady state fault is detected, step 230 is performed to characterize the steady-state fault and subsequently steps 214, 216, 218, and 220 can be performed if appropriate. If a steady-state fault was not detected, steps 200 and 202 can be repeated to determine which branch in the flow chart should be followed. It should be understood by those of ordinary skill in the art that other faults or other types of signals (e.g., voltage) can be monitored for such functionality. In addition, variations in the steps (e.g., a deletion of steps or reordering of steps) can also be implemented if desired.

In the techniques illustratively described herein, the fault interrupt circuitry was found to be sensitive to faults when wired for 3-wire or 4-wire "Y" loads. A 3-phase load is typically wired to be either a delta or a wye configuration. For example, a boost pump motor is typically a wye load, meaning one side of each phase is tied together in a single junction. Aircraft wiring diagrams sometimes also show this junction to be tied to a neutral wire, to ground at the motor case, or left open. Fault interrupt circuitry 108 can for example detect open, line-to-line, and line-to-ground faults in any of these three conditions. One advantage of this is that in other known types of conventional protection techniques designed for ground fault detection, the protection has no ability to detect some fault types when the junction is floating open.

Figure 12:
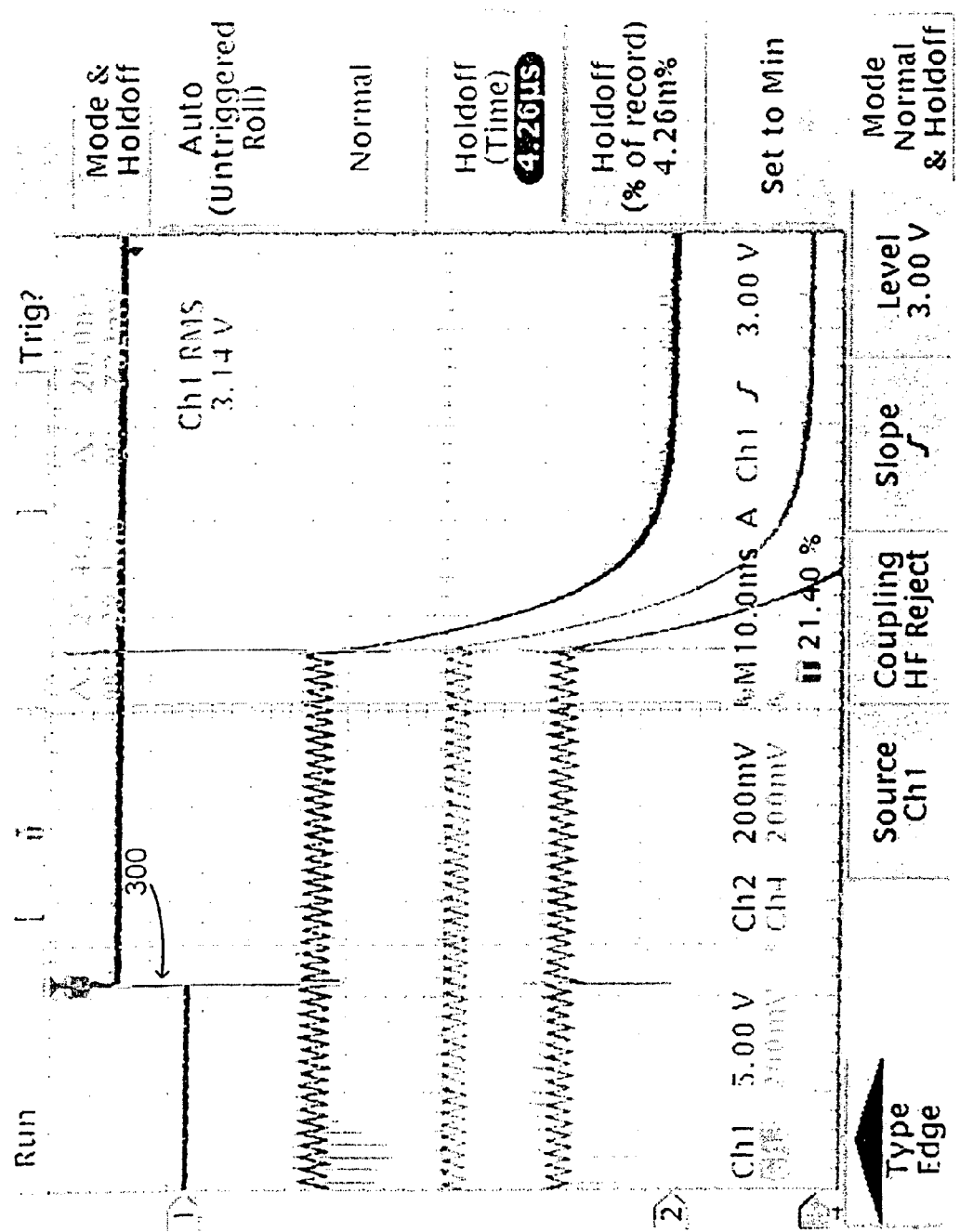
FIGS. 12-15 are signal diagrams illustrating different faults being detected by fault protection circuitry in accordance with one embodiment of the present invention.
Figure 13:
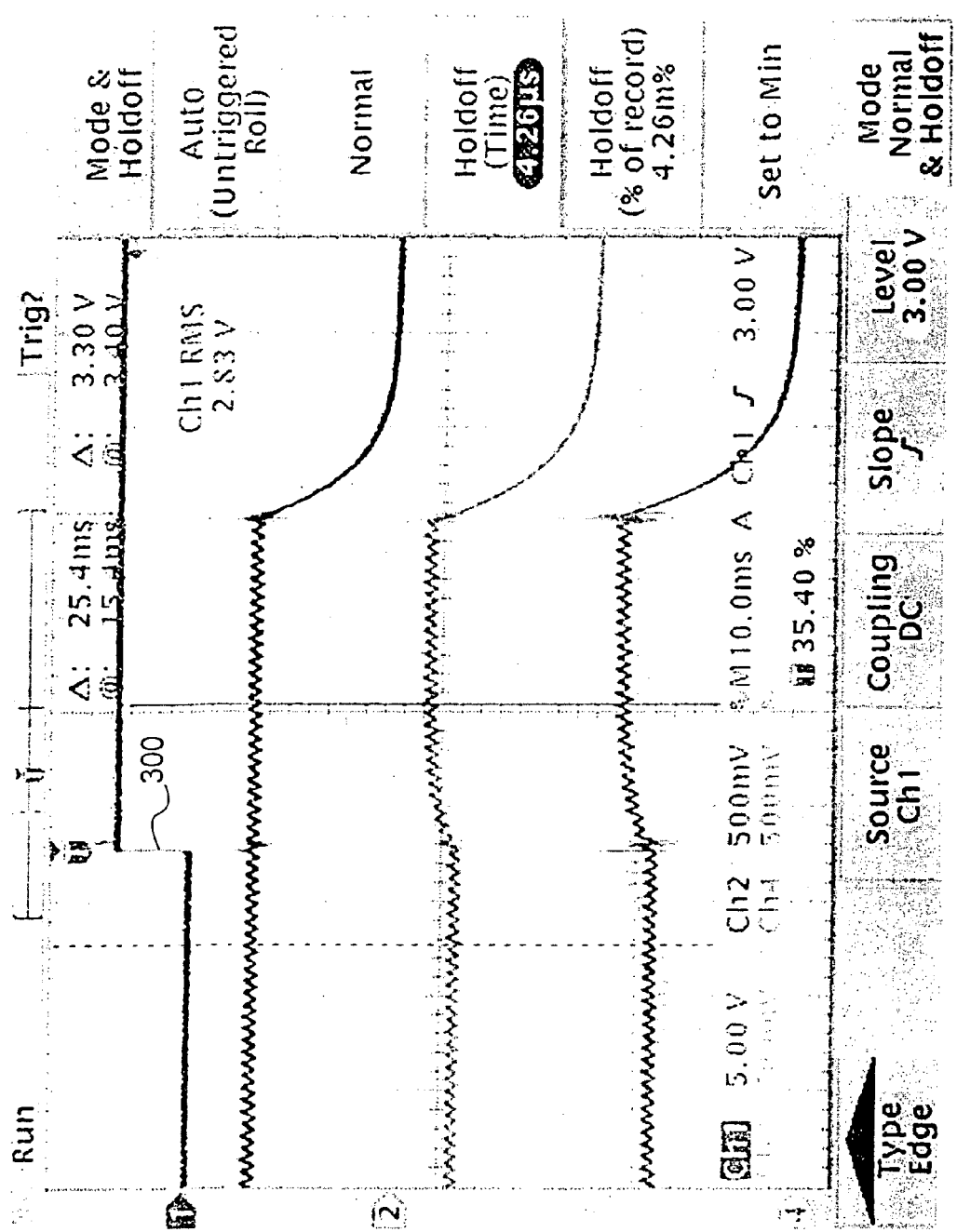
Figure 14:
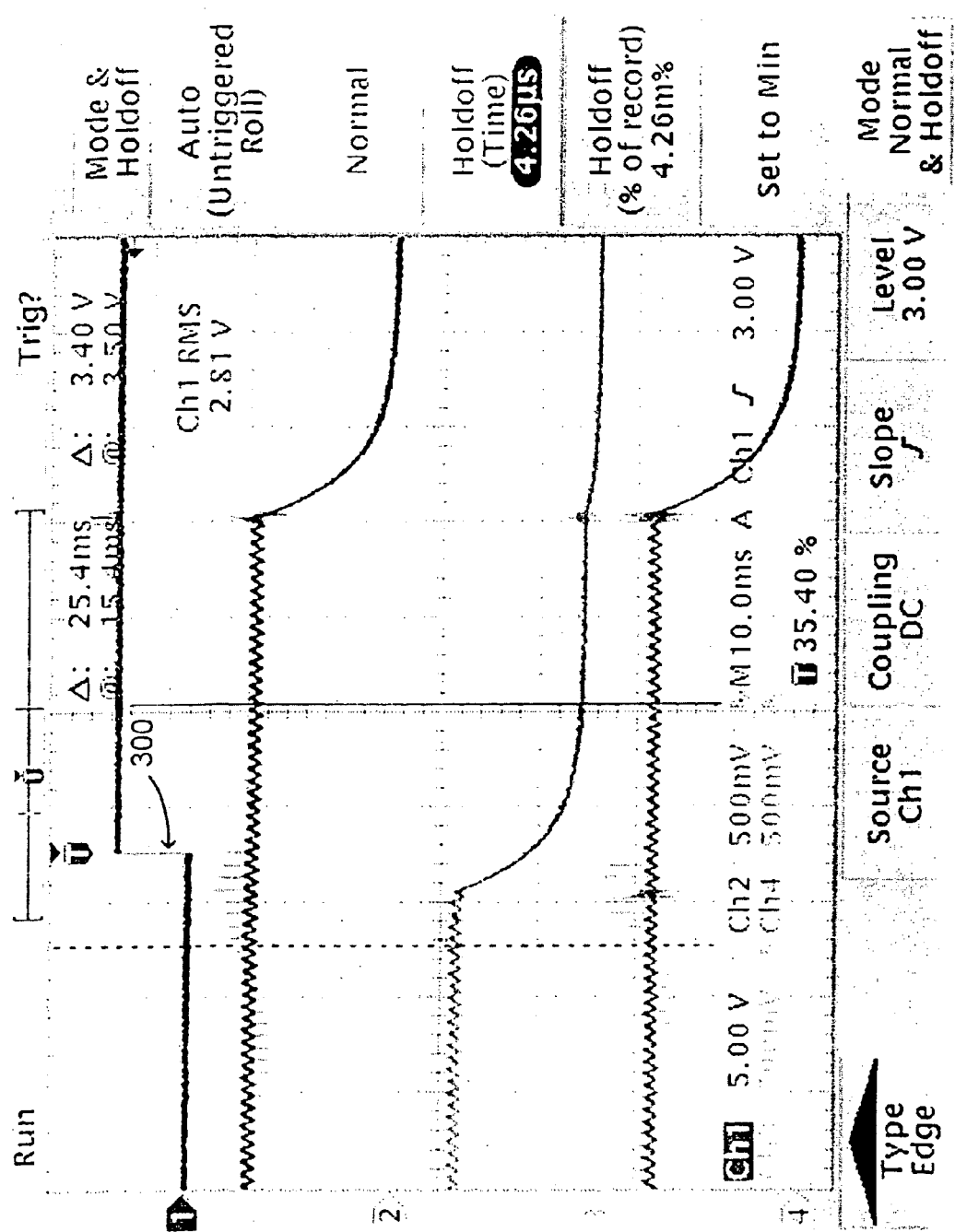
Figure 15:
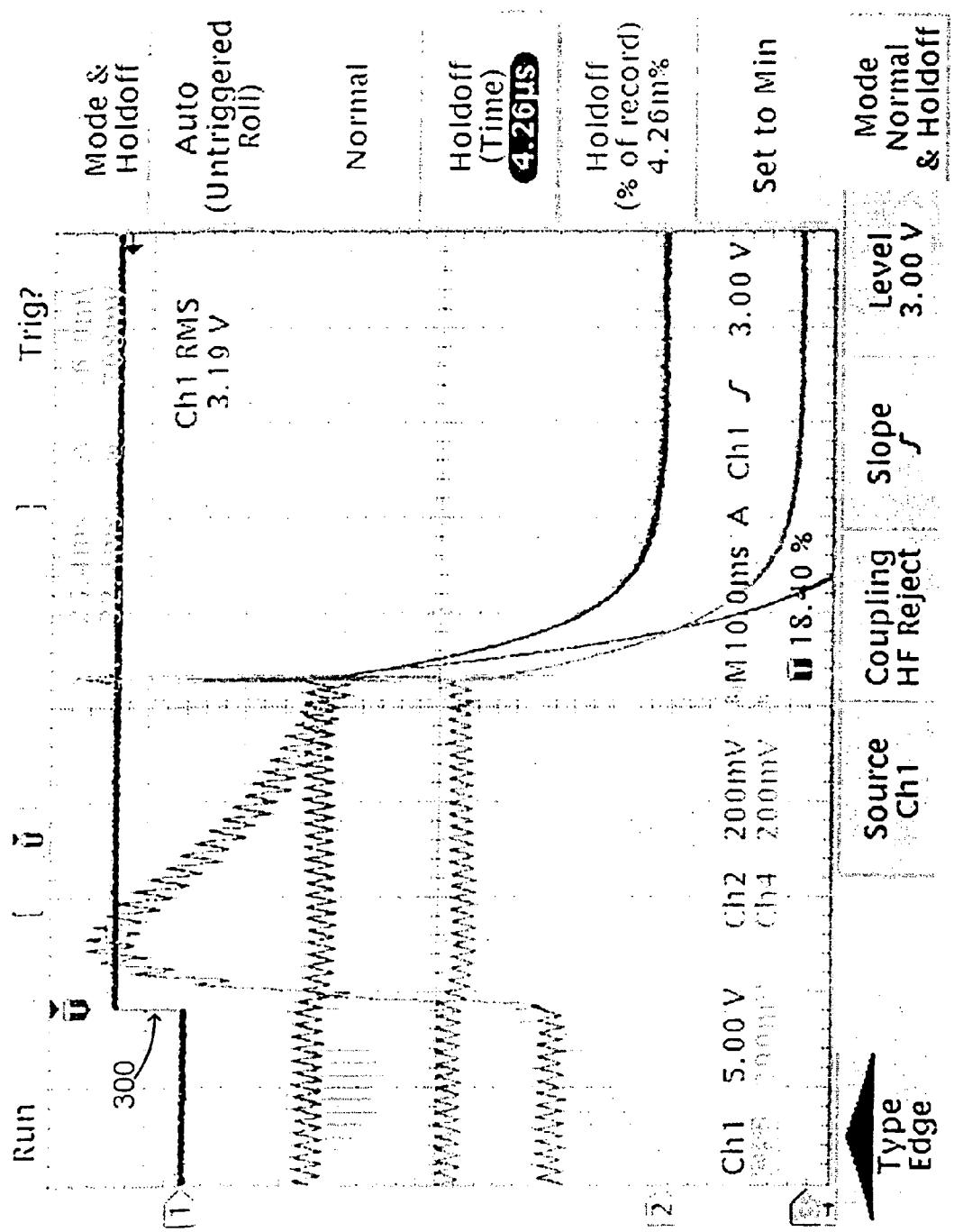

FIGS. 12-15 show examples of signal diagrams that illustrate the operation of fault interrupt circuitry 108. Signal 300 shows that a fault has been detected (e.g., by the hardware detection circuitry) when signal 300 is raised to open the relay or switch. In each signal diagram, a delay is depicted between the time the signal is raised due to a fault and the time the three phase currents are disconnected. This is because of the delay which results between the time that the signal to open the switch is raised and the switch fully opens. This parameter is not a controllable parameter. During this period, fault interrupt circuitry 108 continues to monitor the power signal, e.g., the three phase, to identify the type of fault that has occurred. A further reason for the gap between the two events is that the signal diagrams for the three phases are from analog inputs of microprocessor 138, which are slower than signals in the hardware detection circuitry due to the RC filter that is applied to those signals before being applied to microprocessor 138. Each of FIGS. 12-15 shows a different type of fault. FIG. 12 shows that an arc fault has occurred. FIG. 13 shows that a line-to-line fault has occurred. FIG. 14, shows that an open fault has occurred, which may be an intermitting opening in a wire. FIG. 15 shows a signal diagram for a ground fault.

Figure 16:
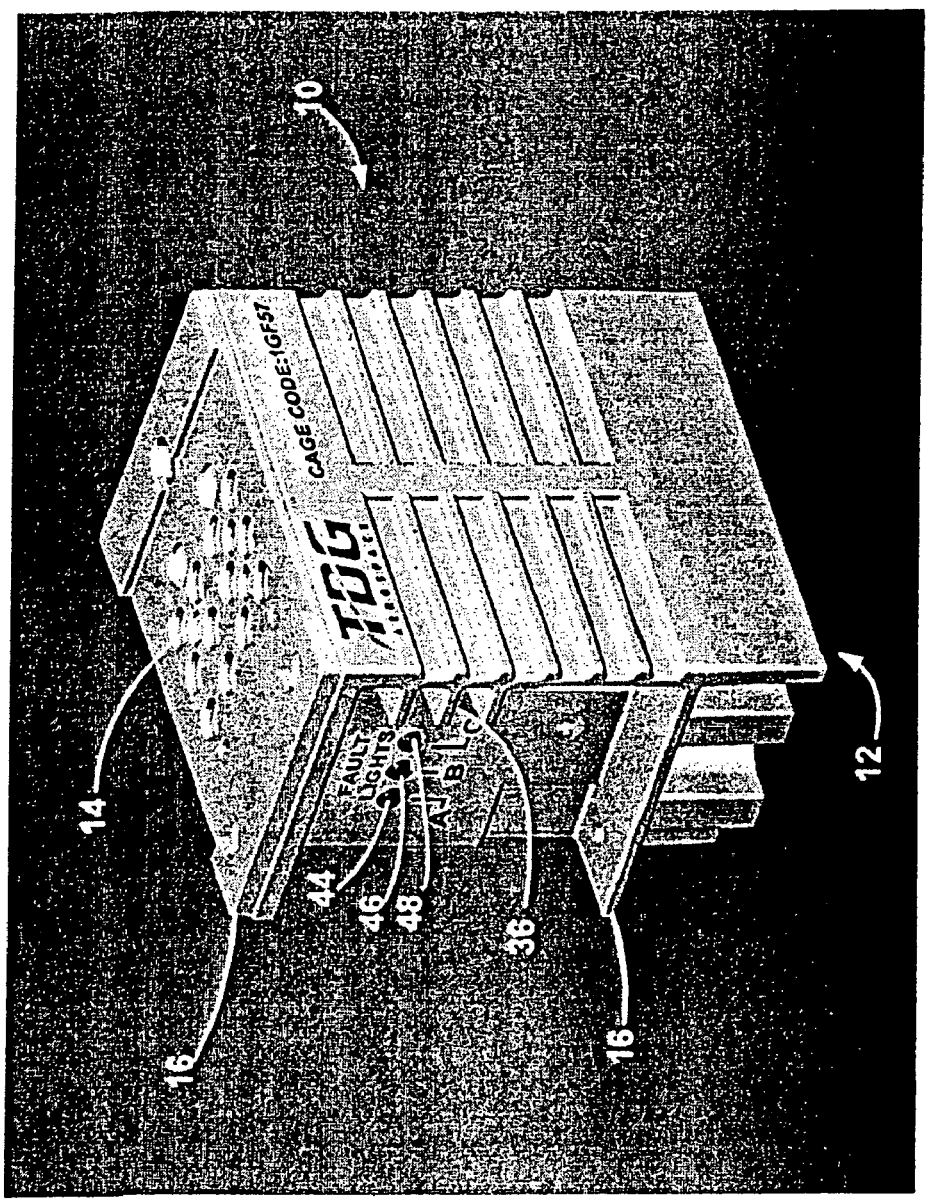
FIGS. 16-25 are diagrams of perspective views of examples of physical components and housing of fault protection circuitry in accordance with embodiments of the present invention.
Figure 17:
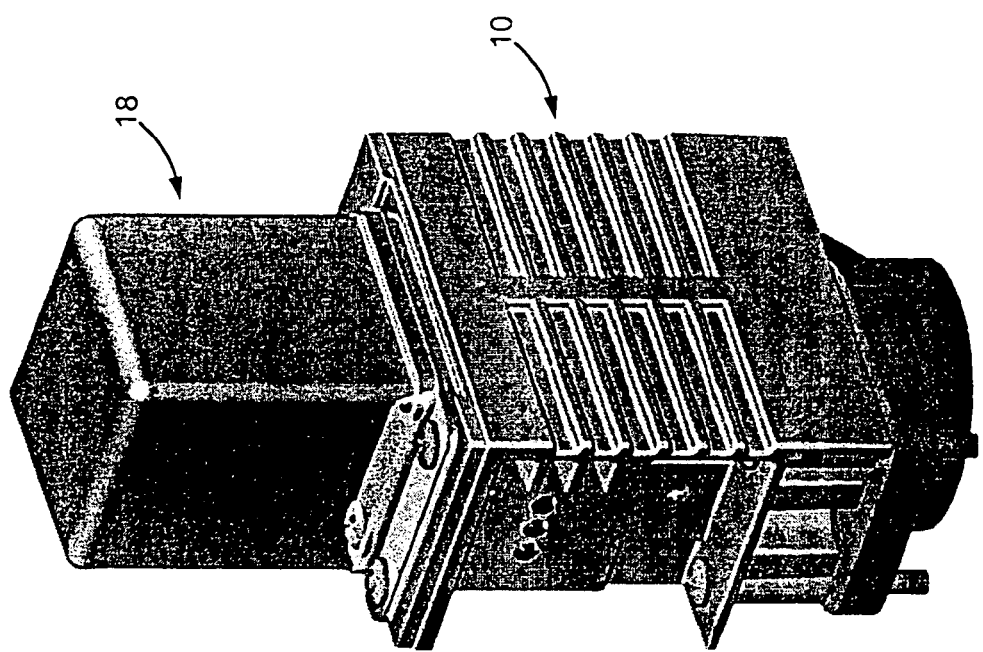
Figure 18:
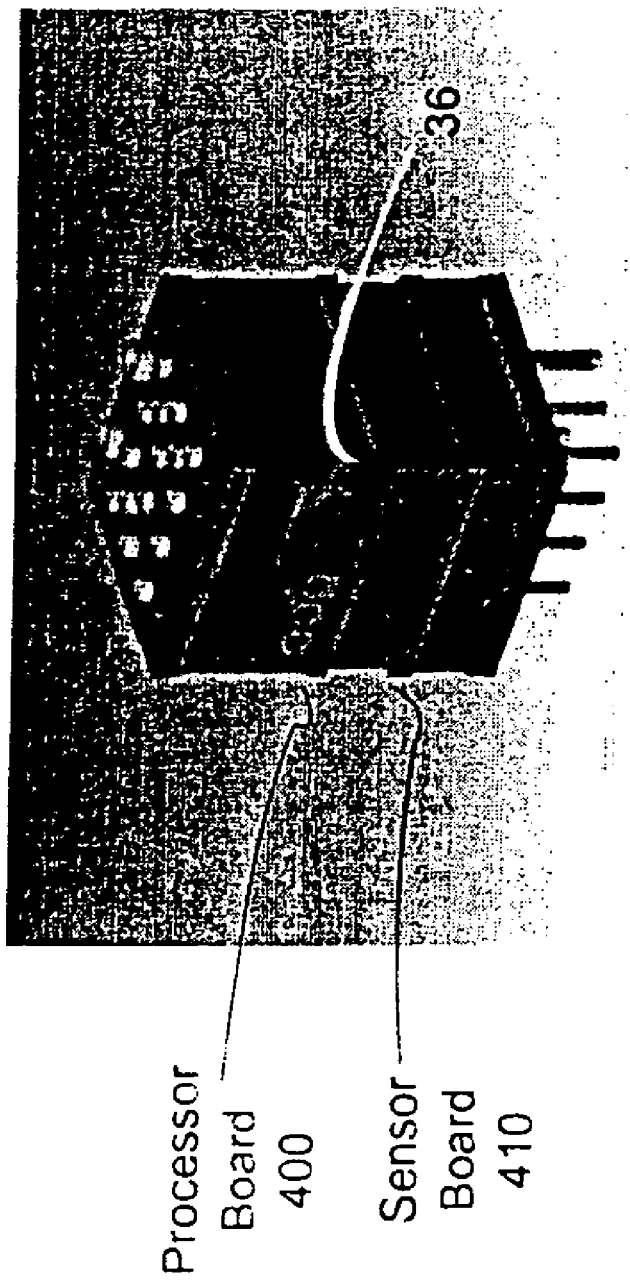
Figure 19:
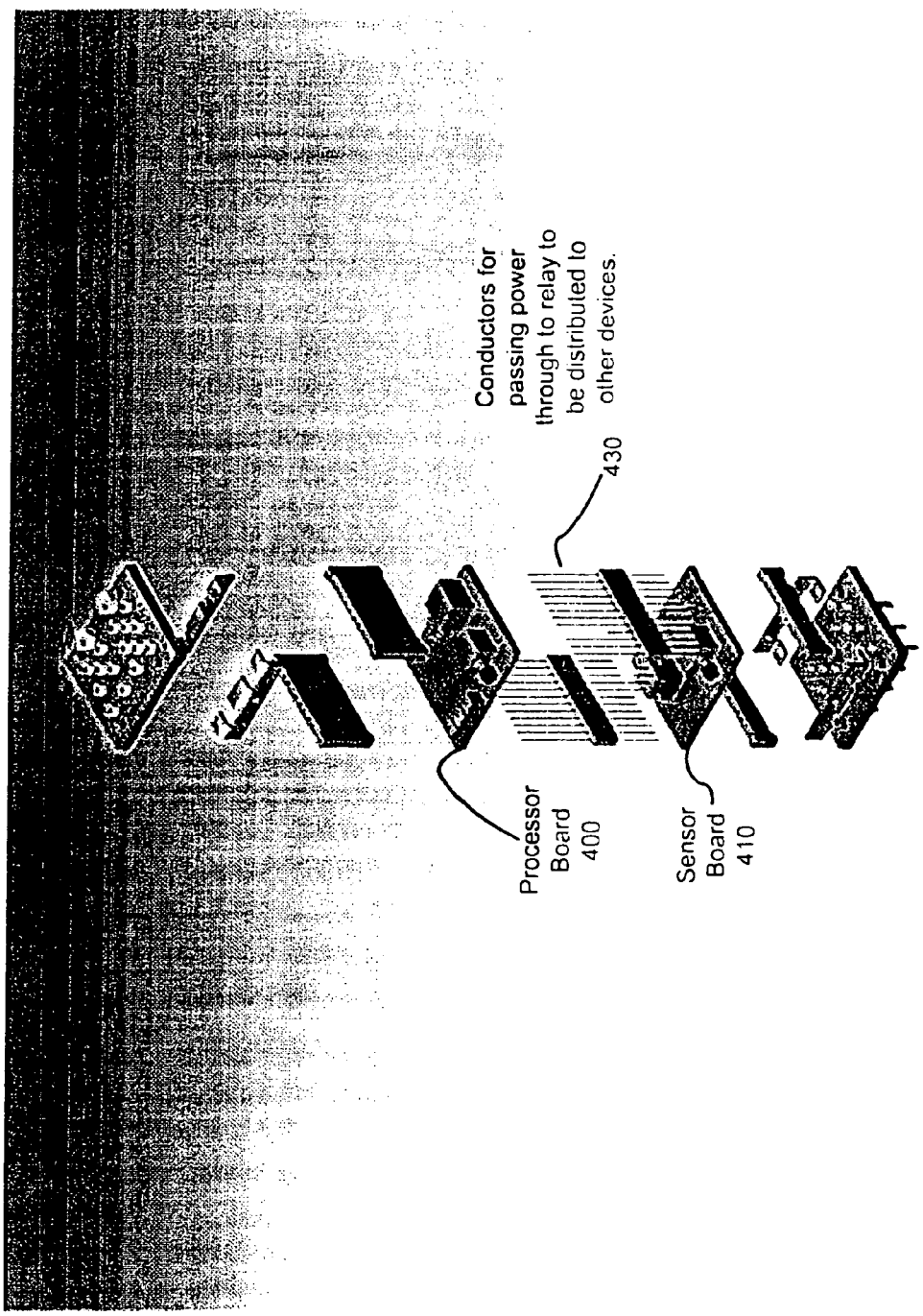

FIGS. 16-25 show illustrative physical arrangements and packaging for fault interrupt circuit 108 which can be particularly suitable for a relay in an aircraft electrical system for purposes of illustrating and not limitation. In FIG. 16, fault interrupt device 10 includes housing made of a metal enclosure (e.g., a die cast Zinc or Aluminum alloy enclosure) which can, for example, have dimensions suitable for a conventional aircraft relay (e.g., a length of about 1.5 inches, a width of about 1.5 inches, and a height of about 1.25 inches). These dimensions can enable device 10 to fit within the confines of appropriate aircraft sockets and designated housing. Device 10 includes male connector 12 designed, for example, to fit into a female relay socket, and female connector 14 in an upper surface for accepting the male pins of relay 18 (shown in FIG. 17). The housing, for example, also includes flanges 16 for securing the casing to the relay with screws to, for example, create a solid assembly. Because no new relays are required, existing aircraft can be easily upgraded to include device 10. Such enhancements in fault detection in a small lightweight plug-in device provide needed improvements in the field of aircraft electronics and other suitable fields. As mentioned above, the circuitry illustratively described herein to provide fault detection functionality can be implemented with a high level of performance in a physical structure that is much smaller than a personal computer or an oscilloscope.

Reset button 36 can be located directly on device 10. However, implementations are contemplated wherein the reset button can be located in some other location such as the cockpit of the aircraft, or other aircraft location accessible to maintenance and/or repair personnel. FIGS. 18-25 show various examples of circuit board and connector arrangements and housing configurations. Fault interrupt circuitry 108 can include a number of circuit boards, for example, a sensor board 410 and processor board 400, that are stacked with other components such as top and bottom connector boards for connecting to a relay and a relay connector, respectively and spacers and other structural support components.

Figure 20:
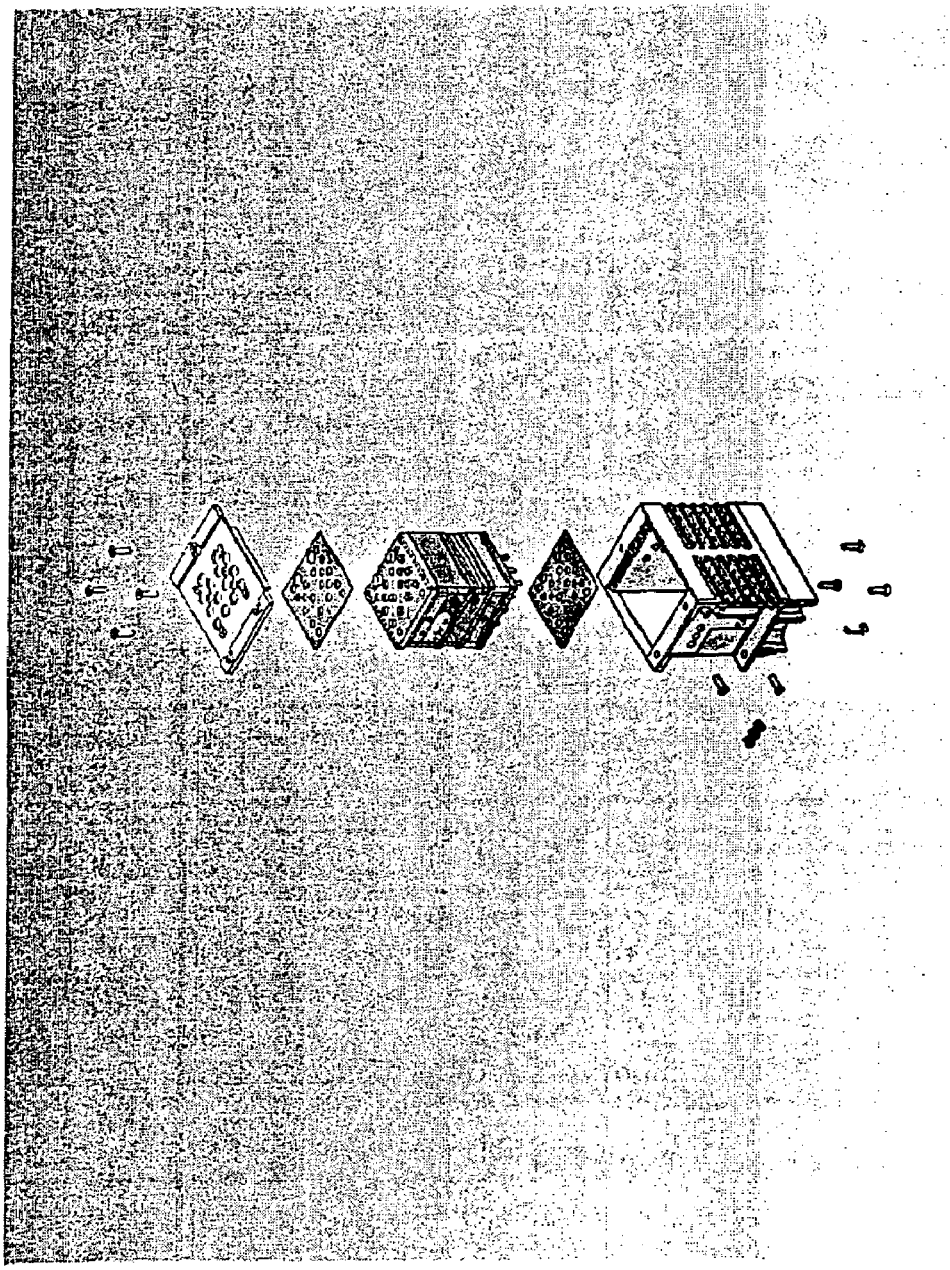
Figure 21:
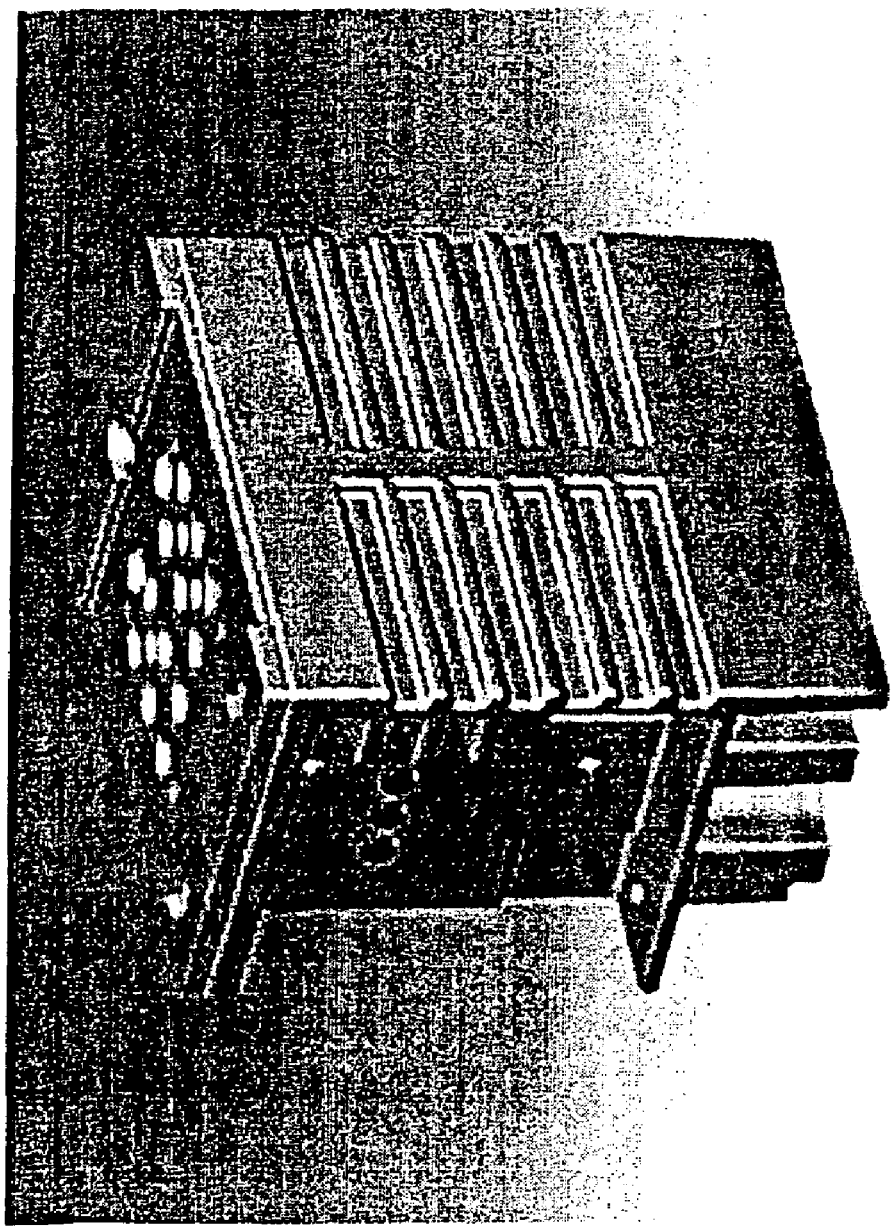
Figure 22:
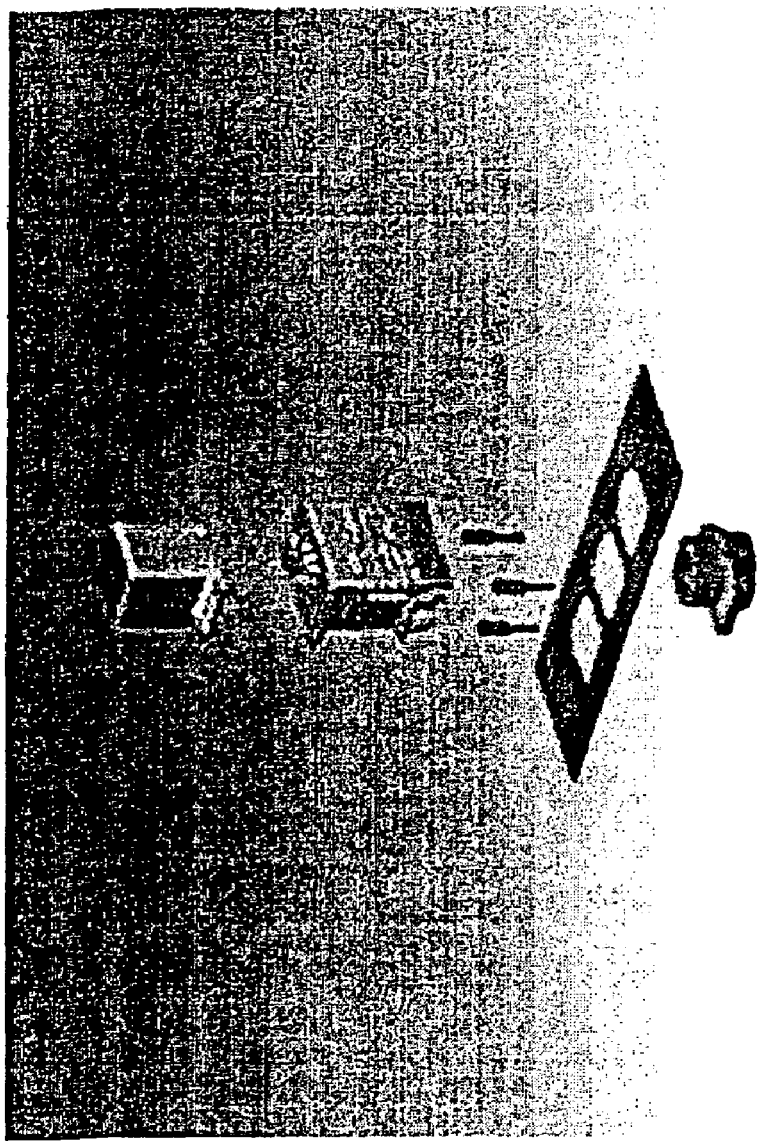
Figure 23:
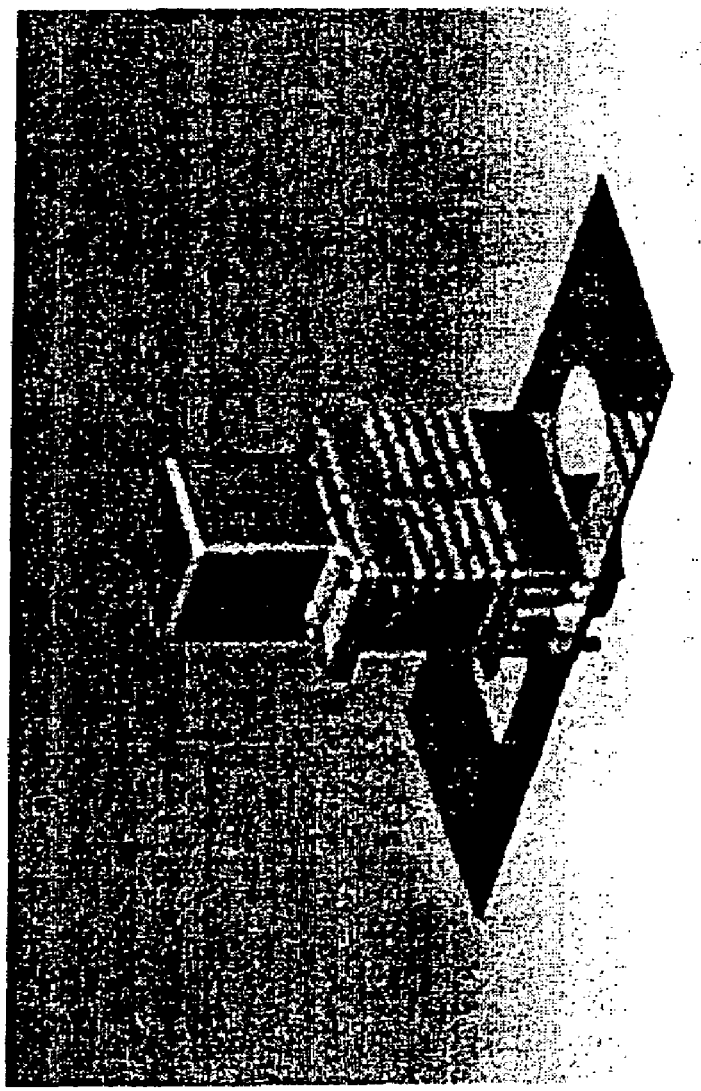
Figure 24:
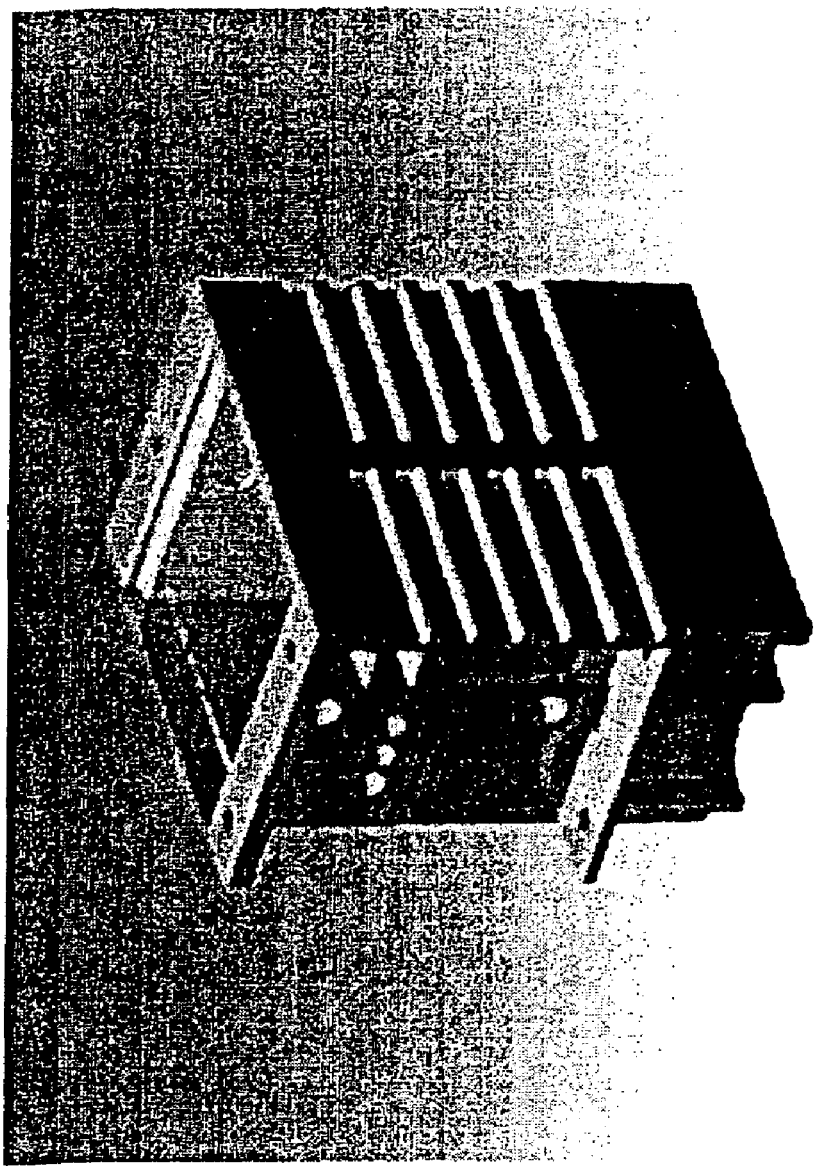
Figure 25:
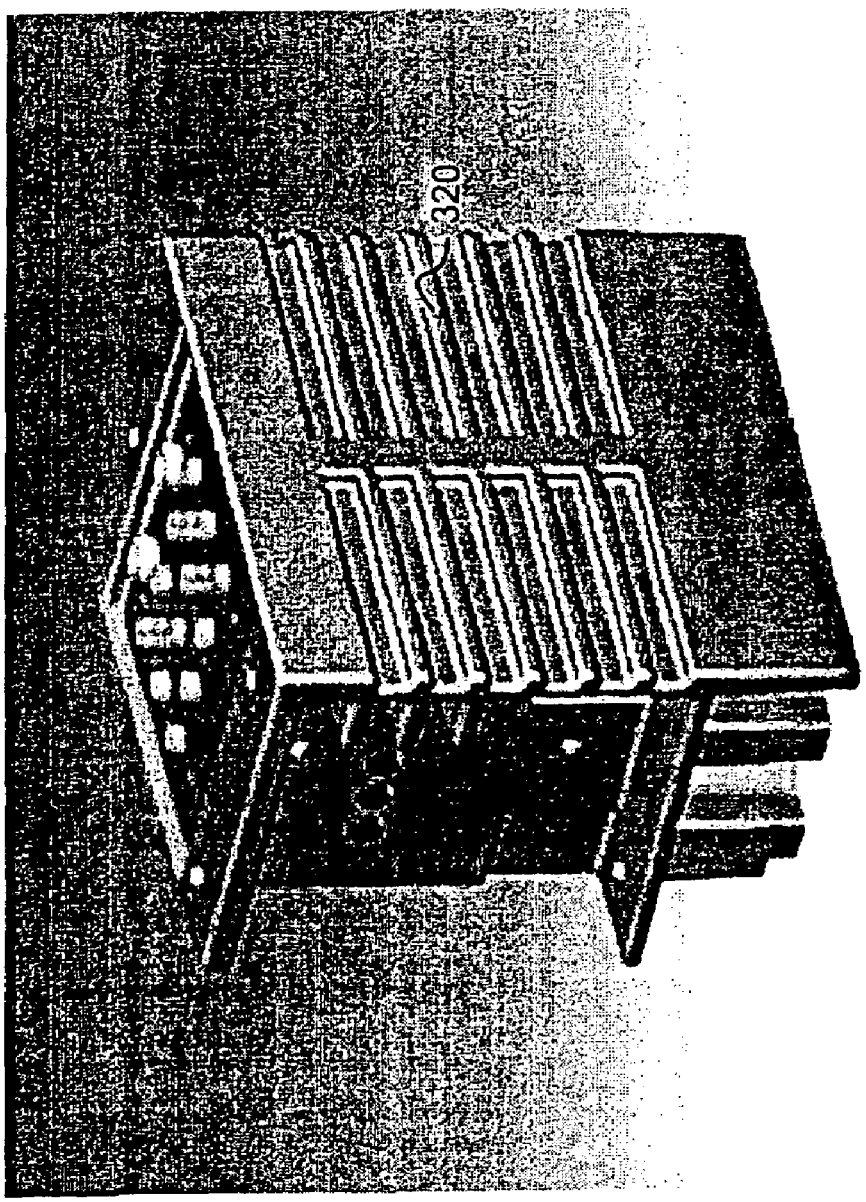

A number of conductors 430 can be arranged to run vertically in parallel, such as, power-in conductors 114 and power-out conductors 116. Power-in can be supplied along one edge of the sensor and are generally routed horizontally across the sensor board 410 to the opposing edge and routed up to the relay using conductors on that edge. Hall sensors may be used on the power signals when the signals are routed horizontally across the sensor board 410. The stacked arrangement shown in FIG. 18 can be inserted in the housing and secured as shown in FIG. 20. Top and bottom connectors can be attached to opposing ends of the housing and with the use of the arrangement shown in FIG. 22, the fault interrupt device, relay, and relay connector can be secured together as shown in FIG. 23. Another example of a housing for the fault interrupt device is shown in FIGS. 24 and 25 which includes additional fins 320 for heat dissipation and flanges for additional structural stability.

Figure 26:
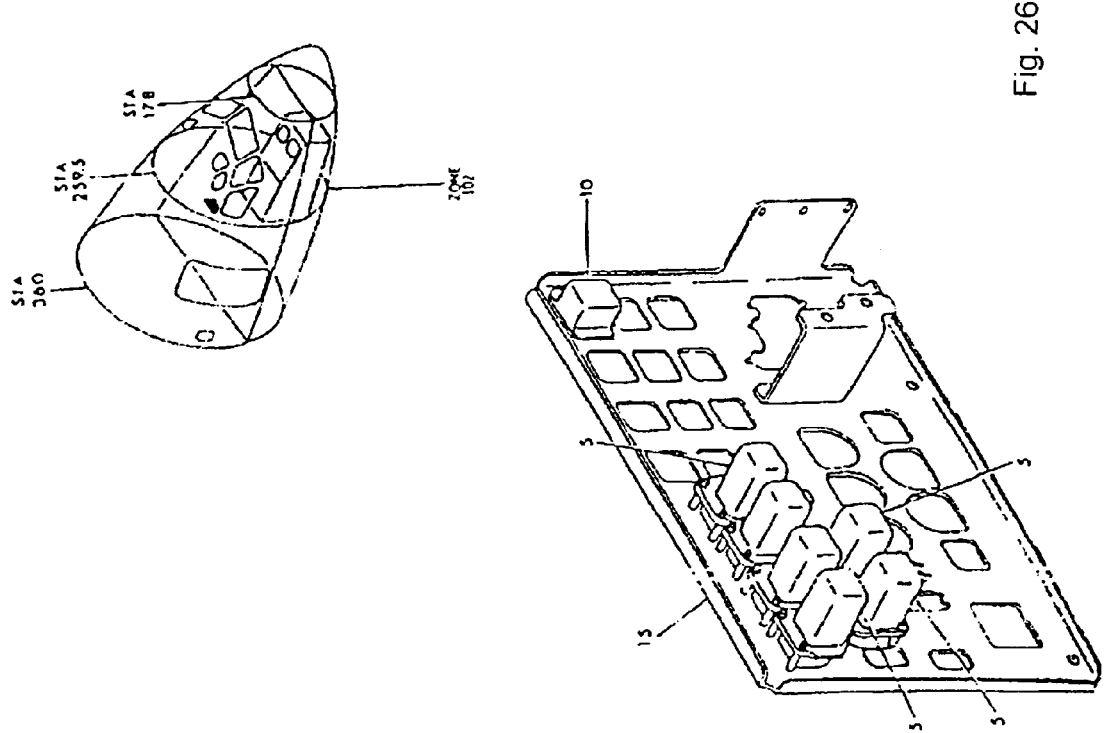
FIG. 26 is a diagram illustrating a panel and a location for the panel in which fault protection circuitry may be implemented in accordance with the present invention.
Figure 27:
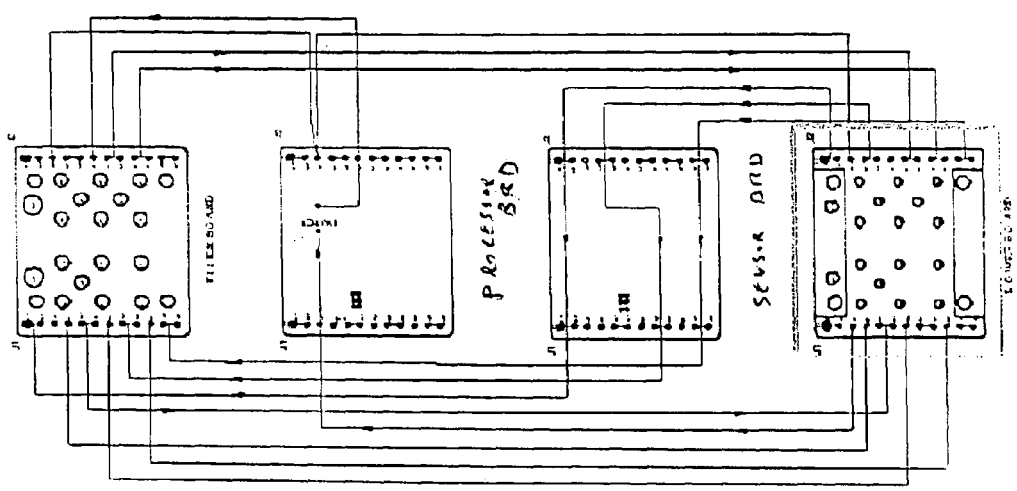
FIG. 27 is a diagram of illustrative routing for power conductors in a fault protection device in accordance with the present invention.

FIG. 26 shows an example of a panel in an aircraft on which a relay such as the relay discussed is mounted and the fault interrupt device is used as a plug-in device for fault interruption purposes. Such systems can already include circuit breakers in some other location within the electrical system, which can be rendered to be without use because the fault interrupt device is likely to have a quicker response time to faults than the circuit breakers. FIG. 27 shows an illustrative wiring scheme for layers of a fault interrupt device such as that shown in FIG. 18. The sensor board shown in FIG. 27 shows one exemplary routing arrangement for routing power signals across the sensor board. In another example, the "dog-leg" geometric arrangement mentioned above may be used for such routing to minimize cross talk.

In another aspect, the fault interrupt device can be configured to set a delay for activating a relay or switch when the relay or switch is initially turned on. This can, for example, be beneficial when the system is changing from one source of power to another source of power that includes such relays or switches wherein the ongoing operation of a subsystem may cause high voltages or back EMF once the transition occurs which can cause damage or a fault to occur. By the use of the (e.g., programmable) delay, the activation of the relay or switch using a preset period can smooth the transition between the power sources (e.g., switching an aircraft from external power to the internal electrical system of the aircraft). A protection device such a diode can be installed in the circuit (e.g., in an appropriate location on one of the boards) to protect on-board circuitry from damage due to back EMF. Circuitry designed to filter electromagnetic interference may also be implemented as part of the fault interrupt circuitry (e.g., on a lower board that plugs into a relay socket) to protect against such interference from the relay or other device to which the circuitry is coupled.

Fault interrupt circuitry 108 can also include circuitry for monitoring the DC voltage for powering that circuitry (e.g., the 28 VDC) so that circuitry 108 can be shut down and a fault declared if that voltage drops below a certain level, which is also indicative of the existence of a fault.

If desired, the physical characteristics of the circuit boards can be suitably selected to help in dissipating heat (e.g., by increasing the copper content of the boards). Other heat dissipation measures as mentioned above can also be provided to combine for better heat performance. For example, circuit components with higher temperature thresholds can be used. The geometry of the chassis and the power conductors can be arranged for heat dissipation.

If the relay or switch that is to be controlled by the fault interrupt circuitry 108 is a solid state switch, the delay in opening the switch or relay in response to a fault will be substantially reduced, which can limit the amount of data that can be gathered for identifying the type of fault that triggered the fault condition. In such situations, detection of faults can be implemented. However, processing for detecting fault type will have to be configured to adapt to the shortened period for monitoring.

While the embodiments discussed herein are primarily in the context of the applications in an aircraft, the fault protection apparatus illustratively described herein is also useful in many other systems. Other vehicles, including watercraft, aircraft, and land vehicles can employ such fault protection apparatus. Additionally, a fault protection apparatus as illustratively described herein may be useful in other devices and machinery that employ electric circuitry. In places where combustibles are stored, such as in ships or petroleum refineries, such fault protection apparatus can help prevent fires and explosions that have potentially devastating effects. A fault protection apparatus as illustratively described herein can further prevent accidents in environments in which smoke or even minor fires caused by arcing electrical systems can lead to catastrophic events, such as in buildings and surgical operating rooms in addition to aircraft cockpits. Also, such fault protection apparatus can be used in smaller components or in power supply lines to the components, such as in stereo systems or television sets to prevent potential damage to the unit. High power devices can also benefit from use of a fault protection apparatus as illustratively described herein, such as power tools and large electric machinery and motors. When used with these devices in more critical environments, such as an aircraft or sea vessels, the hazard of a fire in a tight space is also substantially reduced.

While the fault protection apparatus illustratively described herein can be used in selected subsystems, such as in connection with a fuel pump, flap motor, or cabin lighting, many or all of the electrical systems of the fault protection apparatus can be monitored by one or more of the fault interrupt apparatus. The signals from all of the fault interruption circuits can be routed to one or more location, such as to a cockpit fault protection apparatus control panel. In some embodiments, the fault interruption circuits themselves can be located together in a location. The fuel pump fault protection apparatus can be located in the cockpit, for instance, along with multiple other fault protection apparatus so they can be monitored and reset from that single location.

As explained above, the preferred embodiment uses analog circuitry to detect the faults, for example, by detecting the current slowly increasing in a circuit. This current is tracked over time so that the software applies logic to detect the fault and to control the opening of the circuit. In another embodiment, the detection system is made from digital components.

The logic and/or parameters used in the logic of the fault protection circuit are preferably programmable, such as through the provision of an electronic connection, such as a serial port. In this manner, the fault protection can be used on a variety of circuits or with different operational characteristics by modifying the logic or parameters. Preferably, the parameters can be modified independently of the operating logic software.

If desired, the fault interrupt circuitry of the present invention as illustratively described herein may be implemented to detect a loss of input voltage to the fault interrupt circuitry and to disconnect the power line in response to detecting the loss of input voltage.

If desired, the software implemented on a microprocessor to provide the illustrative functionality described above can be of the type that can perform multi-threaded operations in order to allow more than one software task to run at the same time while interrupt service routines handle input and output processing. If desired, the main loop in such a multi-threaded implementation can dispatch tasks using a state machine approach. The tasks may for example be of three types: operate tasks (fault and PCR handling), history task (database management), and data port task (data port access control). The operate task can for example be responsible for fault processing and PCR handling: acquiring real-time power data, analyzing data and qualifying power anomalies, detecting and registering faults, activating/deactivating PCR drive as appropriate, outputting status to indicators, and responding to the reset switch input. The history task can for example be responsible for database management: performing periodic statistical updates (e.g., determine whether wear is leveling and replace data as a result), logging detected fault and error events, maintaining integrity of items stored in memory, and reporting historical data. The data port task can for example be responsible for data port access during maintenance activity: receiving input from a data port, parsing and executing commands, and outputting data. Data that is stored may include fault type, fault magnitude, fault history, etc.

In another aspect, the circuitry and methods illustratively described herein is configured to perform some output operation that may include the opening of a relay or switch but may include other output operations. As such, in response to the detection of a fault, the circuitry may save data, transmit data, generate a display, or generate a signal(s) for some other output operation. The data port may be a tool by which maintenance personnel can connect their equipment to fault interrupt circuitry. Data stored or processed by the fault interrupt circuitry (e.g., transient faults, steady state faults, voltage levels, current levels, phase, duration, time of event, etc.) can be transferred to maintenance equipment. This maintenance activity can be a valuable tool in diagnosing and monitoring the equipment condition or expected performance characteristics of electrical systems or mechanical components powered by such systems.

If desired, circuitry or electronic device components illustratively described herein can be implemented not only as described herein but also in other ways using software, hardware (e.g., using discrete circuit components), or a combination thereof. Software-based implementation, hardware-based implementation, or a combination can be applied in each case if desired.

As illustratively described herein, generating a signal or producing an output signal that is indicate of a state or condition can be implemented through a number of signaling techniques including by pulling a signal high or low as desired to signal the information.

ALTERNATIVE EMBODIMENT

Due to the changing environmental conditions in aircraft fuel tanks caused by turning, elevation changes, or depleting a fuel tank, it is possible that a fuel primer pump can run dry. Because a typical fuel primer pumps passes fuel through the pump motor windings to cool the device, it is hazardous to operate the pump without the presence of fuel as the heated windings, when exposed to heated motor coil windings and fuel vapor, can result in fire or explosion. Currently, pump dry-running conditions within fuel tank and pumping systems may be handled in the following ways:

1. A visual inspection of a low pressure light or corresponding fuel indication gauge are made and then, if needed, a manual switch is actuated in order to interrupt power to the pump.
2. A mechanical and/or electromechanical mechanism such as a pressure switch or a floating device, that reaches a minimum "empty" tank level and either mechanically or electrically causes an interruption of pump power.

The first technique has the disadvantage of relying on human reactions (i.e., noticing an indicator and then flipping a switch.) The second technique has the disadvantage of relying on mechanical parts that may give false readings, due to sloshing or tilting of the fuel in the tank, and that may cause the pump to shut down inappropriately or, more dangerously, not at all due to mechanical wear or physical damage.

The present invention includes a system that relies solely on the fuel pump's electrical response to discern a dry-running condition. That is, when a fuel pump "loses prime" and begins dry-running, its impeller no longer pushes against a liquid. When this happens the pump experiences a decrease in fluid resistance and no longer requires as much electrical current to turn the pump rotor. This decrease in current occurs across all three phases equally and the resulting electrical signature is very recognizable from electrical measurements. The run-dry detection has been implemented in the fault detection devices of the present invention, and which may be plug compatible with existing aircraft fuel pump relay systems.

The run-dry detector of the present invention includes a combination of hardware (such as Hall effect sensors, rectifiers, resistors, A-to-D converters) and software with overlapping detection mechanisms devised to mitigate operational failures. In summary, the software continuously checks the current on all three phases and compares the phases at that point in time against each of the other phases and then against the phases from the previous 5 milliseconds worth of signal samples. If the current in all three phases drops more than a specified amount (10% for example), and the voltages present on all phases remain constant, and a programmable duration of time expires (15 seconds, for example) then the dry-running condition is assessed, a signal is sent to the hardware to remove power from the pump, and an alert is generated. All of the parameters that control this functionality are stored in non-volatile RAM and may be revised to match various operating environments.

Such a run-dry detection system overcomes all of the disadvantages of the previously discussed techniques above by (a) removing human error, (b) localizing the fuel pressure "detection" within the pump itself, and (c) obviating the need for additional cables and costly installation that may degrade overall system reliability. The result is an easy-to-install and easy-to-use dry-run detection system with reaction times on the order of only a few milliseconds.

Figure 30:
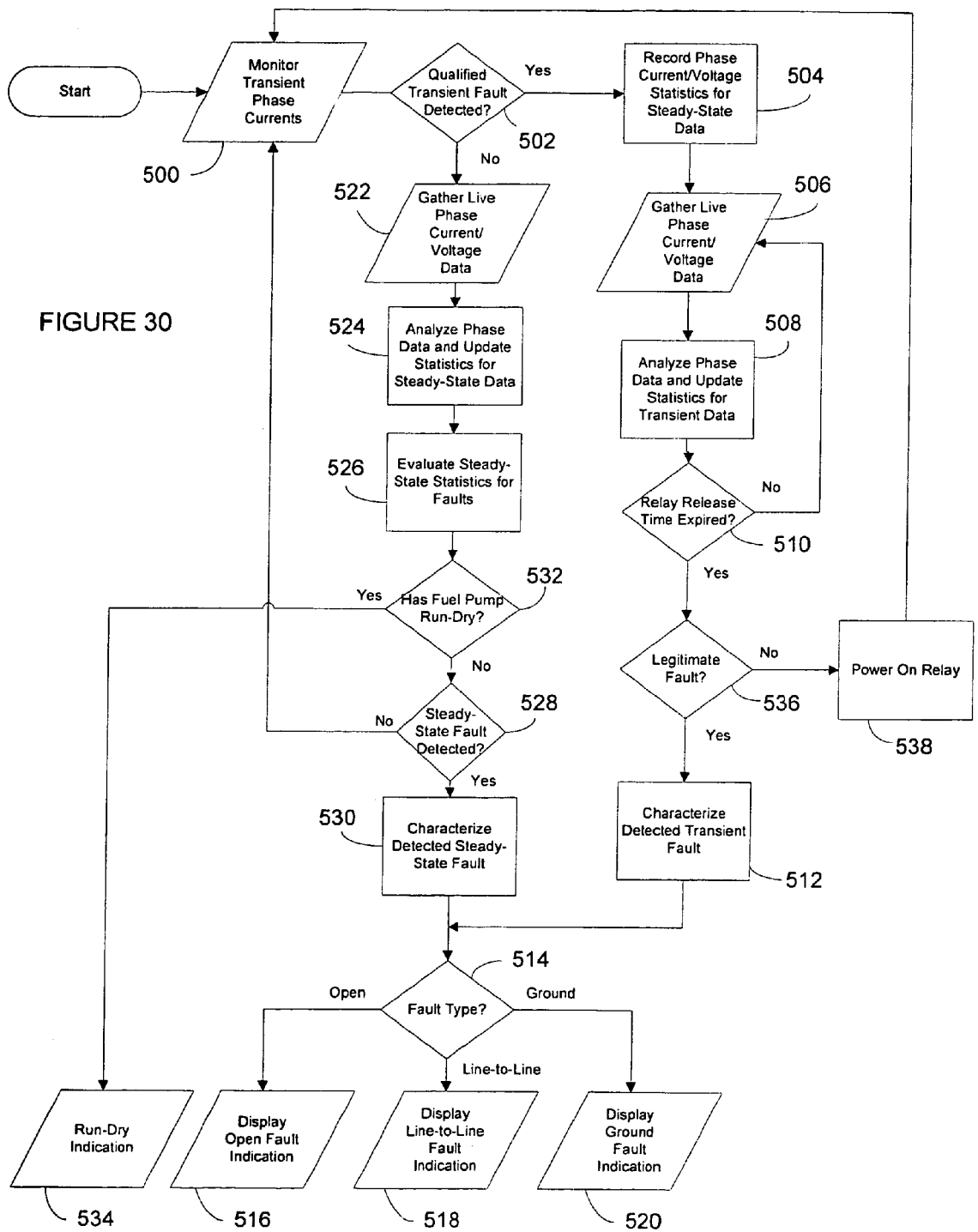
FIG. 30 is a flow chart of illustrative steps involved in detecting and identifying faults in accordance with one embodiment of the present invention, with a particular emphasis on detecting the "run-dry" fault and steps to terminate the fault condition.

Referring now to FIG. 30, fault interrupt circuitry 108 can be configured using software and related circuitry to detect faults in accordance with the illustrative steps as shown in FIG. 30. Software based fault detection and hardware based fault detection may be configured to detect the same types of faults (e.g., while operating independently in parallel) such as to detect ground type faults (e.g., a high current detected on or more phases of a three phase power line), line-to-line type faults (e.g., a high current detected in two phases of three phase power line), an open type fault (e.g., a low current detected in one or more phases of a three phase power line), an arc type fault (e.g., a high energy short duration event), and an imbalance type fault (e.g., a condition in which the current of any phase of a multi-phase system becomes higher or lower than the average current by a certain minimum amount, which can be the current running through a 50 Ohm load). Transient faults can be categorized into two different types of faults comprising series faults and parallel faults. Other ways of categorizing faults types may also be used.

In addition to the type of faults that can be considered transient faults, which itself includes different types of transient faults (e.g., a ground fault, open, etc.), there may be other types of faults such as steady-state (or drift) faults. A steady state type fault can for example be of the type in which a high current is detected in all three phases of a three phase power line as a steady state condition, which can indicate that the pump motor is beginning to show signs of failure. Steady state faults are primarily detectable using software based fault detection. At step 500, transient phase currents of power signals on conductors can be monitored. At step 502, fault interrupt circuitry 108 can detect the existence of a transient signals (e.g., using hardware fault detection circuitry) as for example illustratively described herein.

As mentioned above, faults can be categorized in different ways such as series and parallel faults. Series faults can include short circuits within a pump motor winding and open faults. Series faults typically occur in series with the path of circuit current. Series faults are sometimes also referred to as open faults. Series faults are complete or intermittent opening of the conductive path. In a three phase power line, an open fault on one of the lines can create a fault condition. For example, a three-phase motor can overheat and seize with a missing phase. An open can cause an imbalance that the hardware detection scheme detects and initiates power interruption. The software can for example be configured to detect the drop in phase current and/or voltage and power interruption to continue to completion.

Arcs are another type of fault that can be detected and identified. For example, in aircraft wiring under in-flight vibration, an intermittent open such as a loose connector contact, can produce arcs each time the conductors pull apart due to the high load inductance of the load. These arcs can build up carbon and continue to make the arc worsen. Fault interrupt circuitry 108 is for example configured to be sensitive to the arc.

Parallel faults include line-to-ground faults, line-to-line wiring faults, and shorts within windings. Parallel type faults as opposed to series type faults can for example include line-to-line and line-to-ground faults: Parallel faults occur in parallel with (across) the path of circuit current. These include direct or resistive connections between a line and ground, or between two lines (phases). Since these types of faults are "driven" by the source they persist and can be considered dangerous.

As mentioned above, threshold values or settings can be used as the basis for an electric fault. For example, the threshold can be set to 50 Ohm for line-to-line, line-to-ground, imbalances, or any other types of faults as desired. This example setting can be understood to indicate that it has the sensitivity to detect a fault if any phase behaves as if it is leaking current to another line or to ground through a 50 Ohm load. This example is applicable to series windings faults and arcs.

In the particular application aircraft boost pump motors, one particular fault type is sometimes referred to mistakenly as a "series short." Motor windings can over time break down internally with heat, and arcs can occur from one layer of winding to another. This will tend to make one phase winding intermittently look shorter than the other two and unbalance the phase currents. In a 4-wire system, where the junction of the phases is tied to ground or back to the source via a neutral wire, this fault is indistinguishable from a ground fault, because it looks like an impedance to neutral or ground across the affected phase, and it will be identified as a ground fault. However, in a 3-wire system there will be excessive current in the affected phase, which can split through the other two phases back to the source. Fault interrupt circuitry 108 can detect this as a fault (e.g., a parallel type fault). Thus, at step 502, such different types of faults can be detected. Also at step 502, transient faults that are detected may be filtered to eliminate nuisance conditions from the detected transient faults as for example illustratively described herein.

Nuisance conditions can be detected faults that do not meet certain criteria indicative of a fault condition of concern. Filtering nuisance conditions may include signal processing to evaluate signal characteristics to identify detected faults and block nuisance conditions from interrupting power to the load. Such filtering can include analog filters, digital filters, software filters, or combinations thereof. Filtering may also include identifying repeated faults in a limited period of time to identify major faults.

In response to the detection of a qualified fault, a signal can be immediately generated to open a power relay or switch. Depending on the configuration, the signal to open the power relay or switch is generated when a major fault is detected or in response to other fault conditions. At step 504, in response to the detection of a qualified fault, phase current and/or voltage statistics can be recorded. At step 506, live phase current/voltage data can be gathered or stored for analysis. At step 508, the gathered phase currents/voltages can be analyzed and statistics for the phase currents/voltages may be updated. At step 510, it is determined whether the time for the release (opening) of the relay or switch in response to the detected fault has expired. If the duration has not expired, steps 506 to 510 are repeated until the duration expires.

After the relay release time has expired, an analysis of the information collected in steps 506 and 508 can be made to determine if a legitimate fault occurred, or if the signal contained transient glitches that resulted in nuisance tripping of the fault detection hardware. On determining a nuisance trip occurred, step 538 may result in a signal being generated to close a power relay or switch. Conversely, at step 512, based on the information collected in steps 506 and 508 after the fault was detected and determined to be a legitimate fault at step 536, the transient signal that was detected can be characterized.

As mentioned above, at steps 504 and 506, power signal data can be collected, one sample at a time, in a database which can for example be continually updated at a frequency that is a multiple of the natural frequency of the power if the power signal is AC power (e.g., sampling the power signal at about 3200 cycles-per-second). In the database, the instantaneous rectified current for each phase and the instantaneous rectified voltage for each phase can for example be recorded at every frequency-multiple interval. If desired, when a power anomaly is detected, and the signal is generated to interrupt power, software on-board the circuitry can continue to collect power signal data for a period of time, which can be sufficiently less than the time to completely disconnect power (e.g., open a mechanical relay) to allow for restoring or stopping the disconnection of power in the event that the power anomaly fails to qualify as a fault.

In order to characterize a power anomaly, to properly assess a fault condition, the power signal can for example be analyzed by one or more methods. For example, stored voltage data (e.g., each instantaneous voltage level) representing sensed current and/or voltage levels can be examined and compared to upper and lower limits. If the voltages exceed the upper or lower limits, the power anomaly can be disqualified as a fault and normal operation resumes. This conclusion can for example be because the voltage conditions are consistent with the detected current conditions indicating a normal condition such as during power up or power down of the load.

If the stored voltage data are within the upper and lower limits, stored current data (e.g., the instantaneous currents) are analyzed. Stored current data (e.g., each stored instantaneous current data) is examined and a database of integrals is accumulated and analyzed. A three row by three column array database can for example be created, in which each row represents one of the three phases of the power line and each column represents a variable interval of time. Each array element can contain two values: the integral of the current signals (e.g., instantaneous rectified current signals) that are greater than the average current (hereby called the "positive" integral) and the integral of the current signals (e.g., instantaneous rectified current signals) that are less than the average (hereby called the "negative" integral). The interval of time used to integrate over can for example be variable and can for example be determined by computing the absolute difference between the two integrals in an array element and evaluating whether or not one of the integral values is greater than ten-times the other integral value of the pair.

Each time a new current value is acquired, it is integrated into the running value and the difference is then taken. If desired, any instance of a ten-times difference in any phase (i.e. any row) stops the integration process for that column and causes the next column to be used. The previous columns integrals can be copied row by row to the second column and the integration is allowed to continue. This process can continue until all three columns have been created or the total number of samples in the power signal database have been exhausted, in which case all three columns are created at once with the same integral values.

Thus when complete, each array element contains a positive and negative integral of the current for a particular phase (determined by the row) during a particular interval of time (determined by the column). The database of integrals can for example be analyzed by comparing pairs of integrals in each column to characterize the first anomaly event and then to identify a secondary and a tertiary anomaly if they exist. For example, the first anomaly to be characterized results from determining which integral has the greatest magnitude in the first column of an array in a database of integral pairs. If two or more anomalies occur simultaneously, the anomaly with the greatest magnitude will be considered the first. If two or more anomalies occur simultaneously and more than one has the same magnitude, the first one examined will be considered. Secondary and tertiary anomalies can be assessed by evaluating the remaining two columns of an array in a database of integral pairs for similar magnitude and duration attributes (e.g., magnitude within ±30%, total duration within ±50%).

From a minimum of one to a maximum of three anomalies are characterized, the resulting sign (negative or positive) for each dominating integral determining the fault type: either open or short. The determination of an open or short combined with the phases that the short or open occurred can further yield what type of fault occurred. FIG. 29 includes examples of some of possible characterizations using the example 3×3 array and techniques illustratively described herein. The available faults types in this implementation include open fault phase A and/or phase B and/or phase C, Line-to-ground on phase A and/or phase B and/or phase C, line-to-line fault between phases A-B, A-C, or B-C. In these examples, the software can be configured to use time columns that do no represent equal amounts of integration time (e.g., Time 1 can be less than or greater than Time 2). However, if desired, equal time intervals may also be used.

Using unequal time intervals can allow for the identification of how long negative or positive spikes are occurring. If desired, other techniques can also be implemented to characterize faults as part of performing step 512 (e.g., using a different magnitude other ten times the comparison). Such characterization techniques can if desired, also be applied to detect the existence of a fault.

At step 514, the particular fault type at hand can be identified from transient fault characterization of step 512. As such, detected faults can be characterized to be one of a number of different types of faults. At step 516, 518, and 520, appropriate displays can be generated to inform a technician or other individual of the type of fault that was detected. If at step 502, a transient fault is not detected, fault interrupt circuitry 108 can be monitored for steady-state faults as opposed to transient faults. Steady-state faults are, for example, slow gradual changes in signal characteristics that overtime indicate the existence of a fault or problem.

For example, physical wear in a device that is being supplied power that is being monitored by fault interrupt circuit 108 can be reflected in slow changes in the characteristics of the power signal. Such information if recorded can provide sufficient detail for estimating or identifying an expected rate of wear or expected malfunction of devices.

At step 522, live phase current/voltage data can be gathered. At step 524, the gathered phase current/voltage data can be analyzed and steady-state statistics may be updated. Statistical data gathered during operation may be updated periodically, in real time, or in another suitable way. At step 526, steady-state statistics can be evaluated for the purpose of detecting steady-state faults. At step 528, it is determined whether a steady-state fault has occurred. A steady state can be reflected form the statistical data collected overtime which will indicate from the gathered electrical characteristics the current condition of a load (e.g., level of wear in a motor), the existence of a fault, the expected lifetime of circuit components including mechanical components, or other conditions that can be detected from a gradual variation in the electrical characteristics of an electrical system over time. If a steady state fault is detected, step 530 is performed to characterize the steady-state fault and subsequently steps 514, 516, 518, and 520 can be performed if appropriate. If a steady-state fault was not detected, steps 500 and 502 can be repeated to determine which branch in the flow chart should be followed.

Certain other rapid changes in the power being supplied to a device may be detectable by the software, with or without the assistance of the hardware, by analyzing the live phase current/voltage data. At step 532, the gathered phase current/voltage data can be analyzed to determine if a device being supplied power has experienced a sudden change in operation, such as a fuel pump running dry, for example. In the example of a fuel pump experiencing run-dry operation, the current amplitude on all three power phases may drop a certain and equal amount. At the same time, the voltage amplitude on all three power phases would, for the most part, remain the same as they were before the condition occurred.

If it is determined at step 532 that such a condition exists, step 534 can be performed, if appropriate, to indicate the condition exists. In the example of a fuel pump, a signal can be immediately generated to open a power relay or switch in order to remove power from the pump.

One advantage of the system of the present invention is that electrical detection and power control are extremely fast. An electrical device, such as a fuel pump, responds in a predictable manner to conditions, such as running with little or no liquid across the impeller. Other known conventional protection techniques designed to prevent pump "run-dry" conditions involve the use of pressure or sound detection to trigger control of power to the device.

Such rapid response time can provide increased protection against over-heating, metal-to-metal contact and motor fatigue in general, all of which may result in safer aircraft performance, by preventing fuel vapor explosions, for example.

It should be understood by those of ordinary skill in the art that other faults or other types of signals (e.g., voltage) can be monitored for such functionality. In addition, variations in the steps (e.g., a deletion of steps or reordering of steps) can also be implemented if desired.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A power line fault response device, comprising: sensor circuitry configured for sensing an operational aspect of a power line; analog signal processing circuitry configured to detect electrical current in the power line and configured to perform an output operation in response to detecting a fault comprising a variation in the detected electrical current; and digital signal processing circuitry comprising a processor and memory that is configured to detect electrical current in the power line based on the operational aspect and to perform the output operation in response to detecting a variation in the detected electrical current, wherein the output operation comprises generating a signaling output.

2. The power line fault response device of claim 1, wherein the output operation comprises generating the signaling output to signal that the power line should be disconnected from a load to which the power line is supplying power.

3. The power line fault response device of claim 1, wherein the output operation comprises generating the signaling output to signal an indicator to be activated.

4. The power line fault response device of claim 1, further comprising memory, and wherein the output operation comprises storing data generated by the analog signal processing circuitry in the memory for later retrieval.

5. The power line fault response device of claim 1, further comprising memory, and wherein the output operation comprises storing data generated by the digital signal processing circuitry in the memory for later retrieval.

6. The power line fault response device of claim 1, further comprising memory, and wherein the output operation comprises storing data generated by the analog signal processing circuitry and the digital signal processing circuitry in the memory for later retrieval.

7. The power line fault response device of claim 1, wherein the sensor circuitry and the analog signal processing circuitry are configured to perform the operation to prevent a detected fault from damaging a load being supplied with power by the power line.

8. The power line fault response device of claim 1, wherein the sensor circuitry and the digital signal processing circuitry are configured to perform the operation to prevent the detected fault from damaging a load being supplied with power by the power line.

9. The power line fault response device of claim 1, wherein the digital signal processing circuitry and the analog signal processing circuitry are configured to independently detect faults.

10. The power line fault response device of claim 1, wherein the digital signal processing circuitry is configured to detect transient and drift faults.

11. The power line fault response device of claim 1, wherein the analog signal processing circuitry is configured to detect transient faults.

12. The power line fault response device of claim 1 wherein the power line fault response device is configured to be in circuit with a plurality of power lines that each supply power to different loads and is configured to detect faults on each of the power lines during operation.

13. The power line fault response device of claim 1 wherein the analog signal processing circuitry is configured for detecting faults on a poly-phase power line.

14. The power line fault response device of claim 1 wherein the digital signal processing circuitry is configured for detecting faults on a poly-phase power line.

15. The power line fault response device of claim 14 wherein the digital signal processing circuitry is configured to independently detect faults in each phase of the poly-phase power line.

16. A power line fault response device, comprising: sensor circuitry configured for sensing an operational aspect of a power line; analog signal processing circuitry configured to detect electrical current in the power line and configured to perform an output operation in response to detecting a fault comprising a variation in the detected electrical current; digital signal processing circuitry comprising a processor and memory that is configured to detect electrical current in the power line based on the operational aspect and to perform the output operation in response to detecting a variation in the detected electrical current; wherein the analog signal processing circuitry and the digital signal processing circuitry are each configured to operate independently and simultaneously to respond to faults as they occur to prevent a detected fault from damaging a load being supplied with power by the power line.

17. The power line fault response device of claim 16, further configured to compare the detected electrical current to a stored value within the memory to determine a fault condition.

18. A power line fault response device comprising: sensors configured for sensing an electrical current of a poly-phase power line; analog-to-digital circuitry that receives analog signals from the sensors; processor circuitry comprising a memory that is configured to receive digital signals from the analog-to-digital circuitry and to monitor the digital signals for conditions indicative of faults; means for comparing the digital signals to known values in the memory to determine a fault condition; and means for terminating the fault condition.

19. The power line fault response device of claim 18, wherein the means for terminating the fault condition comprises the processor circuitry configured to remove power to the power line.

* * * * *